US008600800B2

(12) United States Patent
Rowe et al.

(10) Patent No.: US 8,600,800 B2
(45) Date of Patent: Dec. 3, 2013

(54) PARKING LOCATOR SYSTEM INCLUDING PROMOTION DISTRIBUTION SYSTEM

(75) Inventors: Rick Rowe, Las Vegas, NV (US); Jean-Louis Fiorucci, Nice (FR)

(73) Assignee: Societe Stationnement Urbain Developpements et Etudes (SUD SAS), Nice (FR)

( * ) Notice: Subject to any disclaimer, the term of this patent is extended or adjusted under 35 U.S.C. 154(b) by 469 days.

(21) Appl. No.: 12/876,382

(22) Filed: Sep. 7, 2010

(65) Prior Publication Data

US 2011/0015934 A1    Jan. 20, 2011

Related U.S. Application Data

(63) Continuation-in-part of application No. PCT/US2009/003682, filed on Jun. 19, 2009, and a continuation-in-part of application No. PCT/US2008/007727, filed on Jun. 19, 2008.

(60) Provisional application No. 61/275,941, filed on Sep. 4, 2009, provisional application No. 61/197,214, filed on Oct. 23, 2008.

(51) Int. Cl.
*G06Q 30/00* (2012.01)

(52) U.S. Cl.
USPC ...... 705/13; 705/14.37; 705/14.5; 705/14.57; 705/14.58

(58) Field of Classification Search
USPC ...................................... 705/13, 14
See application file for complete search history.

(56) References Cited

U.S. PATENT DOCUMENTS

| | | | |
|---|---|---|---|
| 5,710,743 A * | 1/1998 | Dee et al. | 368/90 |
| 6,266,609 B1 | 7/2001 | Fastenrath | |
| 6,285,297 B1 | 9/2001 | Ball | |
| 6,334,090 B1 | 12/2001 | Fujii | |
| 6,386,450 B1 | 5/2002 | Ogasawara | |
| 6,587,835 B1 | 7/2003 | Treyz et al. | |
| 6,647,269 B2 * | 11/2003 | Hendrey et al. | 455/456.3 |
| 6,885,311 B2 | 4/2005 | Howard et al. | |

(Continued)

FOREIGN PATENT DOCUMENTS

| | | |
|---|---|---|
| KR | 1020040082218 | 4/2006 |
| KR | 10-2007-0091704 | 9/2007 |

(Continued)

OTHER PUBLICATIONS

International Search Report dated Dec. 1, 2010 from International Application No. PCT/US2010/020799.

(Continued)

*Primary Examiner* — Brian Epstein
(74) *Attorney, Agent, or Firm* — Kwan & Olynick LLP

(57) ABSTRACT

A promotion distribution system that distributes promotions based on where a user has parked provides the benefit of allowing providers or merchants to target promotions to particular areas where users park. The target areas may be remote from a merchant's location. In addition, since there are a vast number of vehicle drivers and passengers that park, the system provides a large audience for merchant promotions. The system may comprise one or more parking locators that detect the presence of a vehicle within a vicinity. A repository server and parking kiosk may retrieve promotions for presentation to a user based on where the user has parked and the area in which a promotion is targeted.

16 Claims, 11 Drawing Sheets

(56) References Cited

U.S. PATENT DOCUMENTS

| | | | |
|---|---|---|---|
| 6,912,507 B1 | 6/2005 | Phillips et al. | |
| 7,014,355 B2 | 3/2006 | Potter, Sr. | |
| 7,147,154 B2 | 12/2006 | Myers et al. | |
| 7,188,154 B2 | 3/2007 | Minowa | |
| 7,224,274 B2* | 5/2007 | Silverbrook | 340/539.13 |
| 7,309,009 B2 | 12/2007 | Singer-Harter | |
| 7,342,510 B2 | 3/2008 | Pate | |
| 8,489,112 B2* | 7/2013 | Roeding et al. | 455/456.1 |
| 2002/0007306 A1* | 1/2002 | Granger et al. | 705/14 |
| 2002/0008639 A1 | 1/2002 | Dee | |
| 2002/0084917 A1* | 7/2002 | Hauptman et al. | 340/937 |
| 2002/0099574 A1 | 7/2002 | Cahill et al. | |
| 2002/0109610 A1 | 8/2002 | Katz | |
| 2004/0181496 A1 | 9/2004 | Odinotski et al. | |
| 2004/0226993 A1 | 11/2004 | Fulcher et al. | |
| 2004/0252034 A1 | 12/2004 | Slemmer et al. | |
| 2005/0228583 A1* | 10/2005 | Capuano | 701/207 |
| 2005/0229451 A1* | 10/2005 | Mullens et al. | 40/500 |
| 2005/0258632 A1* | 11/2005 | Currier | 283/56 |
| 2005/0280555 A1 | 12/2005 | Warner, IV | |
| 2006/0010046 A1 | 1/2006 | Van Zandt | |
| 2006/0116972 A1 | 6/2006 | Wong | |
| 2006/0143080 A1* | 6/2006 | Garg et al. | 705/14 |
| 2006/0170566 A1 | 8/2006 | Slemmer et al. | |
| 2006/0250278 A1 | 11/2006 | Tillotson et al. | |
| 2006/0260166 A1* | 11/2006 | Pate | 40/606.03 |
| 2006/0267799 A1 | 11/2006 | Mendelson | |
| 2006/0283941 A1 | 12/2006 | Singer-Harter | |
| 2007/0050248 A1* | 3/2007 | Huang et al. | 705/14 |
| 2007/0129974 A1 | 6/2007 | Chen et al. | |
| 2007/0191026 A1 | 8/2007 | Teplitsky | |
| 2007/0257818 A1 | 11/2007 | Aubrey et al. | |
| 2008/0030373 A1 | 2/2008 | Montgomery | |
| 2008/0033824 A1* | 2/2008 | Packes et al. | 705/14 |
| 2008/0136674 A1 | 6/2008 | Jang et al. | |
| 2008/0291054 A1 | 11/2008 | Groft | |
| 2009/0313104 A1* | 12/2009 | Hafner et al. | 705/14.25 |
| 2010/0070365 A1 | 3/2010 | Siotia et al. | |
| 2010/0191584 A1* | 7/2010 | Fraser et al. | 705/13 |
| 2010/0282836 A1 | 11/2010 | Kempf et al. | |
| 2011/0004507 A1* | 1/2011 | Potkonjak | 705/10 |
| 2011/0060653 A1* | 3/2011 | King et al. | 705/14.58 |
| 2011/0082746 A1* | 4/2011 | Rice et al. | 705/14.56 |
| 2011/0320259 A1* | 12/2011 | Roumeliotis et al. | 705/14.41 |

FOREIGN PATENT DOCUMENTS

| | | |
|---|---|---|
| KR | 10-2007-0092548 | 9/2007 |
| KR | 10-2007-0778618 | 11/2007 |
| KR | 10-2008-0041730 | 5/2008 |
| WO | WO 02/09050 | 1/2002 |
| WO | WO 2008/060016 | 5/2008 |
| WO | WO 2009/154787 | 12/2009 |

OTHER PUBLICATIONS

Written Opinion dated Dec. 1, 2010 from International Application No. PCT/US2010/020799.

Wang et al., "Location Based Services for Mobiles: Technologies and Standards," presented at IEEE International Conference on Communications, May 19-23, 2008, Beijing, China.

Extended European Search Report dated Sep. 13, 2011 from European Application No. 11160747.9.

U.S. Office Action dated Feb. 9, 2012 in U.S. Appl. No. 12/763,077.

U.S. Office Action dated Mar. 28, 2012 in U.S. Appl. No. 13/183,242.

U.S. Final Office Action dated Nov. 8, 2012 in U.S. Appl. No. 12/763,077.

U.S. Office Action dated Jan. 24, 2013 from U.S. Appl. No. 13/183,242.

Extended Search Report dated Jan. 7, 2013 from European Application No. 12175949.2.

Notice From the European Patent Office dated Oct. 1, 2007 Concerning Business Methods, Official Journal of the European Patent Office, vol. 30, No. 11, pp. 592-593, XP007905525.

* cited by examiner

PARKING LOCATOR SYSTEM INCLUDING PROMOTION DISTRIBUTION SYSTEM

CROSS-REFERENCE TO RELATED APPLICATION

This application claims priority to U.S. Provisional Patent Application No. 61/275,941, filed Sep. 4, 2009. This application is also a continuation-in-part of PCT Application No. PCT/US2009/03682, filed Jun. 19, 2009, which claims priority to U.S. Provisional Application No. 61/197,214, filed Oct. 23, 2008. This application is also a continuation-in-part of PCT Application No. PCT/US2008/07727, filed Jun. 19, 2008.

BACKGROUND OF THE INVENTION

1. Field of the Invention

The invention relates to a method and system for determining the status of vehicle parking, including the location of available vehicle parking.

2. Related Art

Locating parking is a big problem in cities all around the world. As drivers search for a parking space, they waste gas, waste time and add to the traffic problems of big cities. The frustration of the search for a parking spot creates stress for those drivers that must frequent big cities for their jobs. Health problems have been linked to high levels of stress.

Thus, what is desired and disclosed herein is an apparatus, system and method to optimize the search for a parking space and reduce the time searching and the amount of energy wasted.

SUMMARY OF THE INVENTION

A parking locator system having a promotion feature which provides promotional materials comprising discounts, benefits, and other offers from businesses, merchants, vendors, and other providers is disclosed herein. The providers may target the promotional materials to one or more target areas that may be remote from the providers' location. In this manner, a provider's promotional materials may be delivered to users that have parked within an area the providers wish to target for promotions. The promotional materials may be provided adjacent a parking lot or other parking area making the promotional materials readily accessible to a large audience.

The promotional materials may be collected and delivered by a distribution system comprising one or more parking kiosks and one or more repository servers. In one embodiment, the repository servers collect promotional materials from the providers while the parking kiosks retrieve and deliver the promotional materials to users. Typically, the promotional materials delivered will be for providers located within a target area of the parking kiosk or parking space in which the user has parked.

A promotion distribution system may be configured in various ways. For example, in one embodiment, a promotion distribution system that distributes promotional materials based on a location of a parking space at which a user has parked a vehicle may be provided. The system may comprise one or more parking locators associated with one or more parking spaces in a vicinity. The parking locators may be configured to generate parking information comprising information indicating the presence or absence of a vehicle within at least one of the parking spaces in the vicinity.

A repository server may be configured to receive one or more promotional materials from one or more merchants and store the promotional materials. The promotional materials may be stored associated with one or more merchant locations and one or more target areas. The merchant locations may be remote from the target areas. The merchant locations may also or alternatively be remote from the vicinity to encourage one or more drivers to visit one or more areas outside the vicinity. It is noted that the promotional materials may also comprise a particular time period in which the promotional materials are valid to encourage the drivers to visit the areas outside the vicinity at the particular time period.

The system may also comprise a parking kiosk. The parking kiosk may be configured to receive the parking information generated by the parking locators in the vicinity, retrieve from the repository server at least one of the promotional materials having an associated target area that overlaps the vicinity, and present the retrieved promotional material to a user parked at the parking spaces along with at least one merchant location associated with the retrieved promotional material.

The parking kiosk may include a display configured to present the retrieved promotional material by electronically displaying the retrieved promotional material. It is noted that the parking kiosk may also be configured to retrieve the of the promotional materials from the repository server having the associated target area that overlaps the vicinity in response to input from a pedestrian requesting one or more of the promotional materials.

The system may also comprise one or more additional parking locators configured to generate parking information for one or more parking spaces in a second vicinity. The parking kiosk may then be configured to receive the parking information generated by the parking locators at the second vicinity and retrieve at least one of the promotional materials from the repository server having an associated target area that overlaps the second vicinity.

As indicated above, a parking kiosk configured to distribute promotional materials adjacent one or more parking spaces is also disclosed herein. The parking kiosk may have a variety of configurations. For instance, in one exemplary embodiment a parking kiosk may comprise one or more communication devices configured to receive parking information indicating the presence of a parked vehicle within one of a plurality of vicinities (each of the plurality of vicinities having a defined area). The communication devices may also be configured to request from a repository server one or more promotional materials having a target area that overlaps the vicinity where the parked vehicle is present, and receive from the repository server the promotional materials along with a merchant location stored in association with the promotional materials at the repository server.

It is noted that the communication devices may be configured to request from the repository server one or more promotional materials having a target area that overlaps the vicinity where the parked vehicle is present and having a merchant location outside the vicinity where the parked vehicle is present.

The communication devices may have a specific purpose. For example, a first communication device may be configured to receive the parking information indicating the presence of the parked vehicle within the vicinity. Likewise, a second communication device may be configured to request the promotional materials having the target area that overlaps the vicinity from the repository server. As another example, at least one of the communication devices may be in communication with one or more parking locators to receive the parking information indicating the presence of the parked vehicle within the vicinity. In addition or alternatively, at least one of the communication devices is in communication with the repository server. It is noted that the communication devices are further configured to transmit the retrieved promotional materials to a portable electronic device belonging to the user.

A presentation device may be configured to present to a user the received promotional materials and the merchant location associated with the promotional materials received from the repository server. Some exemplary presentation devices include a screen, electronic display, printer, and media dispenser.

The parking kiosk may also include a payment acceptor configured to receive payment for parking within the vicinity from the user, and an enclosure configured to secure the transceivers, the presentation device, and the payment acceptor. The enclosure may be configured to secure the transceivers, the presentation device, and the payment acceptor at a location adjacent one or more parking spaces.

Various methods of providing promotional materials based on a vicinity in which a user parks a vehicle are disclosed herein as well. In one exemplary embodiment, a method for providing promotional materials to parked users may comprise receiving one or more promotional materials (including at least one merchant location and at least one target area) from one or more merchants, storing the promotional materials on one or more storage devices accessible via a repository server, and detecting the presence of a parked vehicle in one of a plurality of vicinities.

A promotional material may be retrieved from the storage devices having a target area that overlaps the vicinity in which the parked vehicle's presence has been detected. Retrieving the promotional material from the storage devices may comprise retrieving a promotional material from the storage devices having a target area that overlaps the vicinity and having a merchant location outside the vicinity.

A promotion and a merchant location of the retrieved promotional material may be presented to a user according to the method. Presenting the promotion and the merchant location may comprise printing the promotion and merchant location. It is noted that a time period in which the promotion is valid may be presented along with the promotion and the merchant location, the time period received from the merchants.

One or more parking locators (configured to detect the presence of the parked vehicle in their respective vicinities) may be provided or installed at the plurality of vicinities. A parking kiosk configured to present the promotion and the merchant location to the user may also be provided.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
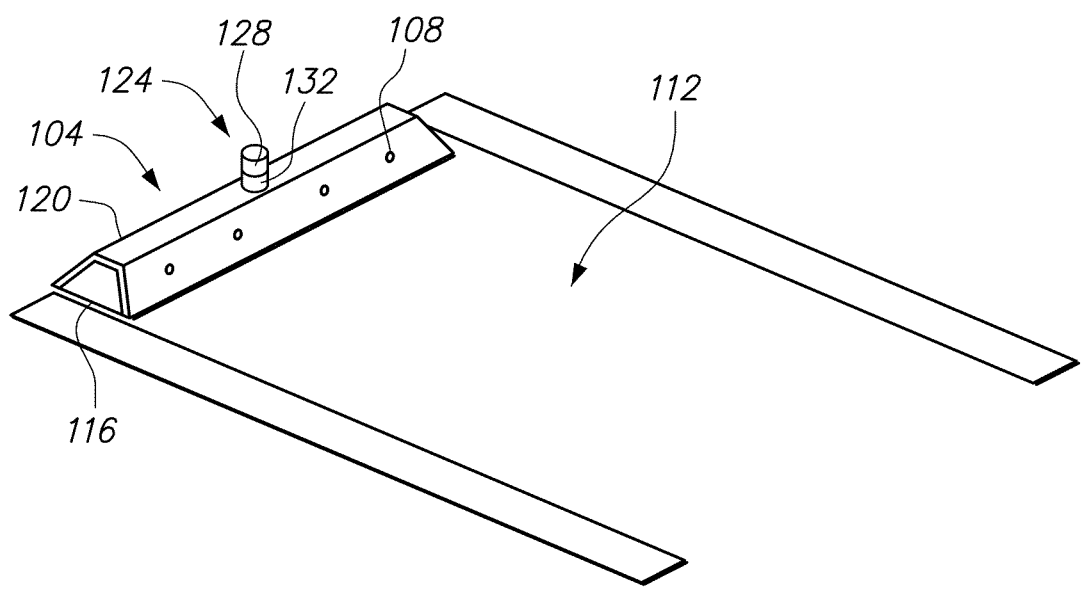
FIG. 1 illustrates a perspective view of a parking locator associated with a parking header according to an embodiment of the invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

A parking locator system including a promotion distribution system is disclosed herein. Accordingly, a parking locator system generally configured to detect the presence or absence of a vehicle within a parking space is disclosed a first aspect of the invention. A promotion distribution system is disclosed herein as another aspect of the invention (among others). As will become apparent from the description below, the promotion distribution system, in general, provides one or more promotional materials (e.g., deals, coupons, offers, etc. . . . ) to users that have parked their vehicles in locations covered by the parking locator system. The promotion distribution system may utilize location information to provide particular promotions to users, as will also be detailed below.

As stated, the parking locator system is generally configured to detect whether a motor vehicle or other object is located within a parking space or other location. The parking locator system may then generate parking information accordingly. Parking information as discussed herein comprises information indicating the presence or absence of a vehicle within one or more parking spaces, and/or the location of an object within a space. It is noted that parking information may include details such as the location or identification of specific parking spaces, directions thereto, and other parking related information as well.

The parking locator may notify external devices or user devices whether or not it detects the presence of a motor vehicle in the parking space it is monitoring by communicating parking information to these devices. As discussed herein, an external device may be another parking locator or another component of the invention. An external device may also be a computer or other device capable of receiving parking information and performing operations thereon, such as displaying, analyzing, storing, or forwarding the parking information. A user device may also be a computer or other device capable of receiving parking information and performing operations thereon. Typically, however, a user device differs from an external device in that user devices will generally be used to present or display parking information to a user, such as for example a driver.

Each parking locator may monitor one or more parking spaces, depending on the configuration of its sensors, and may be connected to form a parking locator system capable of detecting the presence of vehicles within one or more parking areas such as but not limited to parking garages, parking lots, or one or more city blocks.

In one or more embodiments, the parking locator may be used with existing or new parking spaces such as those within a parking garage, on a street next to a curb, or located in a parking lot. Of course, the parking locator may be used with any parking space including temporary event parking and parking spaces in both paved and unpaved areas. The parking spaces or locations may or may not be marked. In one or more embodiments, the parking locator may communicate wirelessly which allows parking locators to be easily deployed in various parking areas.

Figure 2:
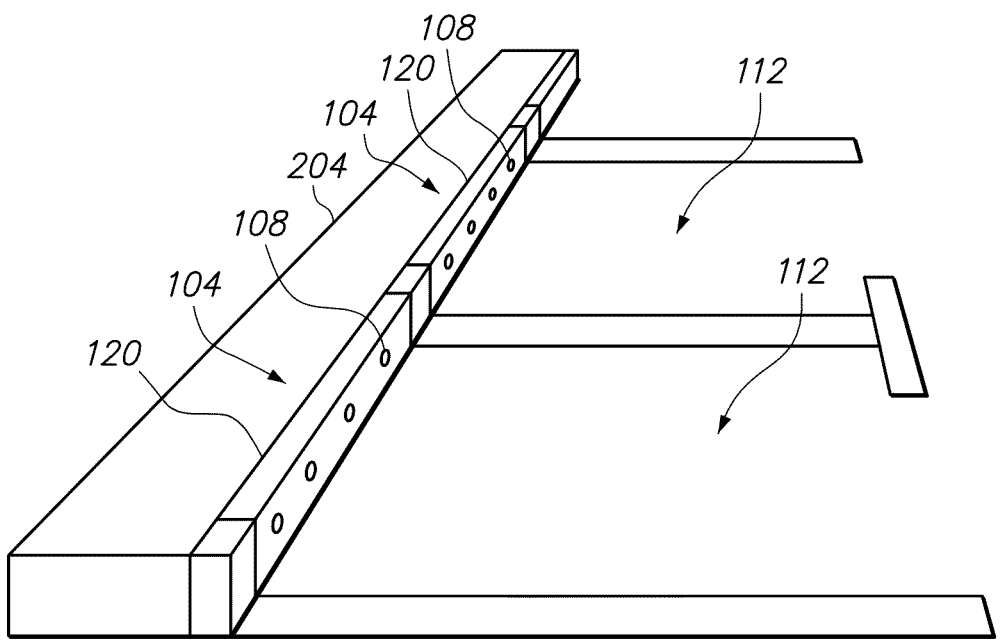
FIG. 2 illustrates a side perspective view of parking locators associated with a curb according to an embodiment of the invention.

FIGS. 1 and 2 illustrate various embodiments of the parking locator 104. In FIG. 1, the parking locator 104 is associated with a parking space 112 such as those found in parking lots. In FIG. 2, the parking locator 104 is associated with curb 204 or street parking spaces 112. Though shown in a specific configuration, it is contemplated that the parking locator 104 may be used with all manner of parking spaces 112 such as but not limited to perpendicular, angled, or parallel parking. In addition, it is contemplated that the parking locator 104 may be configured to account for uncommon, illegal, or improper parking. For example, the parking locator 104 may properly report the presence of a vehicle within a curbside parking space 112 even when one or more wheels of the vehicle are on the curb 204. This type of parking may occur in dense urban areas. The parking locator 104 may also be configured to properly report that a vehicle is illegally or improperly parked such as if a vehicle occupies more than one parking space 112, or if the vehicle is located in a space or location in which parking it not permitted or is time-limited.

The parking locator 104 may include a tower light 124 to indicate if a parking space if occupied or available. For example, the tower light 124 may include a green light or portion 128 and a red light or portion 132 which respectively indicate when a parking space is available or occupied. Of course, additional lights or portions may be provided. In addition, it is contemplated that the tower light 124 may have a single light or portion capable of displaying or emitting multiple colors. The tower light 124 may have other shapes and sizes and may be configured with a speaker system to announce the location of a parking space where a motor vehicle has just parked or just left. In one embodiment, the tower light 124 is mounted on a pole to elevate the tower light so that it may be seen from a distance. The height of the pole may vary according to the situation at hand. For example, the tower light 124 may be mounted at a higher position (i.e. on a taller pole) when in a larger parking lot or area or where it is contemplated that larger vehicles will be parked.

The tower light 124 is advantageous in that it allows open and occupied parking spaces to be easily identified from a distance. Thus, users will not have to drive around a parking area to find an open space. As will be described further below, the tower light 124 may be connected to and controlled by the logic device of the parking locator through one or more electrical, optical, or wireless connections.

In one or more embodiments, the parking locator 104 has a body 120 which may be formed in a variety of different configurations. Generally, the body 120 is a structure which supports the components of the parking locator 104. The body 120 may be configured to be free-standing or self-supporting. In other embodiments, the body is configured to accept or engage another body, such as a parking header 116 or curb 204. In one embodiment, the body 120 is shaped to fit over the edge of a curb 204 on the street as shown in FIG. 2 or formed to fit over the top of a parking header 116 such as that shown in FIG. 1.

It is contemplated that the body 120 may be flat or planar and attached to the parking space 112 or be mounted in or on the parking space. The body 120 may be manufactured from many different types of material including but not limited to cement, plastic, rubber, metal, stone, composites, and even wood or wood products. A durable material is generally preferred.

It is noted that though generally described herein as fitting over a curb 204 or parking header 116, the parking locator's body 120 may be a solid mass forming the edge of a curb or may be a parking header itself. The body 120 may be mounted to the parking surface or another object by various means, such as adhesive, mechanical fasteners or the like.

Figure 3A:
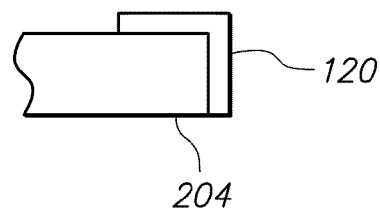
FIGS. 3A-3E each illustrate a cross sectional view of a parking locator's body according to various embodiments of the invention.
Figure 3B:
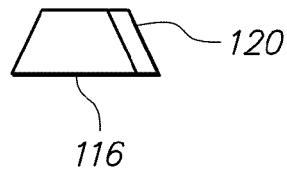
Figure 3C:
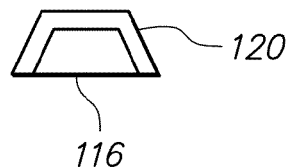

FIGS. 3A-3C illustrate side views of various embodiments of the parking locator 104 which may fit over curbs 204, parking headers 116, and the like. For example, FIG. 3A shows an embodiment where the parking locator 104 is configured to fit over a square curb. FIGS. 3B-3C shows an embodiment having a body 120 configured to fit over a trapezoidal parking header 116. Of course, the parking locator 104 may be configured to fit over any shape and thus a wide variety of parking locators are contemplated. In addition, the parking locator 104 may be configured to partially or entirely cover various curbs 204, parking headers 116 or other structures as shown, for example, in FIGS. 3B and 3C respectively.

As stated, it is contemplated that the parking locator 104 may have a planar body 120 such as shown from side view in FIG. 3B. In this configuration, the parking locator 104 may be mounted to many different surfaces such as the surface of a curb 204, parking header 116, parking space 112, or even a wall. It is noted that the body 120 of the parking locator 104 may include one or more curves as well to accommodate rounded curbs 204, parking headers 116, or other rounded structures.

Figure 3D:
Figure 3E:
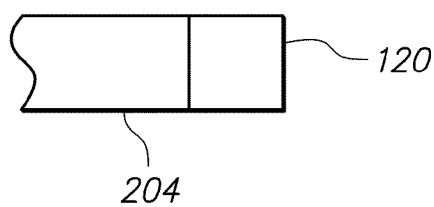

FIGS. 3D and 3E illustrate side views of embodiments of the parking locators 104 having a solid or substantially solid body 120. Generally, these embodiments are meant for stand alone use. For example, in FIG. 3D, the body 120 is formed as a parking header 116 and thus the parking locator 104 may be used without requiring an existing parking header. In FIG. 3E, the parking locator's body 120 is formed as the edge of a curb 204 rather than formed to cover the curb. It is noted that these embodiments need not be completely solid and thus may have one or more hollow sections such as to save on materials or weight. For example, the body 120 shown in FIG. 3D could have one or more holes running along its length to save materials and reduce the weight of the parking locator 104.

In one embodiment, the body of the parking locator may comprise another element, such as a concrete parking stop. In such embodiment, the stop might be modified to accommodate the one or more sensors and/or other components of the parking locator. In addition, the wall of a parking structure, a curb or various other structures might be configured to house, support or contain the various elements of the parking locator.

Referring back to FIGS. 1 and 2, the parking locator 104 comprises one or more sensors 108 to detect the presence of a motor vehicle in one or more embodiments. The sensors 108 may be secured to the body 120 of the parking locator 104 in various ways. For example, the sensors 108 may be attached to the exterior surface of the body 120 or may be embedded into exterior surface of the body. In some embodiments, the sensors 108 may be embedded or attached such that a portion of each sensor 108 protrudes or is external to the exterior surface of the body 120. In other embodiments, the sensors 108 may be secured internal to the body 120 (i.e. held within the body) such that no portion of a sensor is exposed. It is contemplated that individual sensors 108 may be secured by various structures, mounts, fasteners, adhesives, or a combination thereof. In one embodiment, the sensors 108 may be secured by a rotating or pivoting mount which allows the sensors to be pointed in a particular direction or angle. In addition, different ways of securing a sensor 108, such as those discussed herein, may be used to secure sensors of a single parking locator 104.

One advantage to allowing the sensors 108 to be secured in various ways is that particular sensors may operate better depending on how they have been secured. For example, sensors 108 which utilize electromagnetic or radio frequency energy may be secured within the body 120 of the parking locator 104 because such energy can be detected through the body of the parking locator. In contrast, some acoustic or light sensors 108 may be secured such that a portion of these sensors are exposed to better detect sounds or light.

It is contemplated that in some embodiments, an optically, acoustically, or electromagnetically transparent cover may be used to appropriately protect one or more sensors 108 of the parking locator 104. Other covers may be used as well; however, transparent covers have the advantage of reduced interference with the operation of the sensors 108. Of course, where a sensor 108 is within the body 120 of the parking locator 104 such covers are likely not necessary and thus may not be provided.

Figure 4:
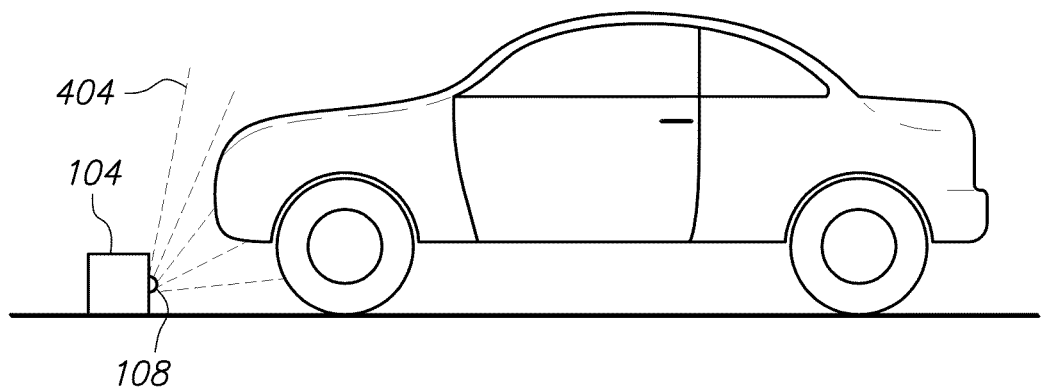
FIG. 4 illustrates operation of a parking locator according to an embodiment of the invention.

Referring to FIG. 4, the sensors 108 may detect the presence of an object within a parking space by emitting one or more detection beams 404 which may comprise acoustic, electromagnetic, radio frequency, or light (including non-visible, such as infrared heat) energy. As will be described further below, a logic device may be used to determine the presence of a motor vehicle within a parking space based on the detection of one or more objects by the sensors 108. Generally, the reflection of a detection beam 404 off an object allows the sensor 108 to detect the object's presence. It is noted that detecting an object includes detecting the presence of a motor vehicle or parts thereof as well as detecting the presence of other physical objects. Though shown as a directed beam, it is noted that the detection beams 404 may be omni directional such as with electromagnetic or radio frequency energy. In addition, one or more of the sensors 108 may be passive sensors which detect vehicles without emitting any detection beams 404.

For example, the sensors 108 may be acoustic sensors which detect the sound of a vehicle, or the sensors may be radio frequency or electromagnetic sensors which detect changes in surrounding radio or electromagnetic energy due to the presence of metals or other materials in a vehicle. The passive sensors 108 may also detect physical contact or movement, such as physical contact with a vehicle or movement of the pavement (including pressure) due to the presence of a vehicle. The passive sensors 108 may also detect the weight of a vehicle in one or more embodiments.

It is contemplated that any type of sensor 108, now known or later developed, which is capable of detecting the presence of an object may be used. In addition, one or more different types of sensors 108 may be used on a single parking locator 104 if desired. The ability to have multiple types of sensors 108 is advantageous in that readings from the various types of sensors may be used to verify the presence of a vehicle such as by comparing the readings from the various sensors. As is known in the art, different types of sensors 108 may have different detection ranges and capabilities and may be chosen to suit different environments, vehicles, or other conditions.

The sensors 108 may be pointed horizontally, such as at a 0 degree angle, or at any other angle to detect a motor vehicle. In a preferred embodiment, the sensors 108 are pointed upward at a 45 degree angle. It is contemplated that the sensors 108 in some embodiments may be adjustable or pivotable to various angles and that each sensor may be pointed at the same or at a different angle than the other sensors of the parking locator 104. As illustrated in the exemplary embodiment of FIG. 4, an angle closer to horizontal may be used to detect vehicles parked further away while an angle closer to 45 degrees may be used to detect vehicles parked close to the parking locator 104. It is noted that pointing a sensor 108 at too high an angle may result in its detection beam 404 going over a vehicle causing the vehicle not to be detected, while pointing a sensor at too low an angle may cause the sensor to detect objects or vehicles outside its parking space. Omni directional, non-omni directional, active, and passive sensors 108 may be pointed and adjusted to various angles in one or more embodiments so as to maximize or fine tune the detection capability of the sensors.

Though shown in FIG. 4 as detecting a vehicle from the front, it is noted that the parking locator 104 may detect a vehicle at any orientation or angle and that the parking locator's sensors 108 may be selected and pointed based on the orientation or angle of the relevant parking space. For example, a parking locator 104 installed on a curb can detect the presence of a vehicle even though the side of the vehicle rather than the front faces the parking locator. The same may be said for diagonally, illegally, or improperly parked vehicles. This is because the parking locator 104 may be configured to detect the location of portions of a vehicle within a particular space as described below.

Each parking locator 104 may be configured to have more or fewer sensors 108 at various angles and spaced apart at various distances depending on the size, type, shape, or other characteristic of various motor vehicles. For example, more sensors 108 may be included in the parking locator to better detect smaller vehicles such as motorcycles, golf carts, scooters, bicycles, and the like. Additional sensors 108 may also be included to detect vehicles in relatively large spaces. Fewer sensors 108 may be included in the parking locator 104 where larger vehicles such as sedans, trucks, vans and the like are parked.

Sensors 108 may be positioned or spaced along the parking locator 104 in various ways. As shown in FIGS. 1 and 2, four sensors are positioned such that two sensors 108 are secured on each side of the parking locator 104. Of course, other sensor positions may be utilized as well. For example, in some parking spaces it may be desirable to detect the presence of motor bikes, electric vehicles, golf carts, or other small vehicles which have a smaller total length then the typical motor vehicle (it should be noted that the parking sensor may be utilized to detect a variety of objects, including vehicles as well as other obstructions such as trash bins, or the like, and that the term "vehicle" is not limited to an automobile but may includes bikes, motorcycles, carts and a variety of other movable objects). Thus, the sensors 108 may be placed closer together. Where there is a need to detect medium size or large vehicles, the sensors 108 may be placed further apart.

It is contemplated that the sensors 108 may be positioned (as well as pointed) to detect specific parts of motor vehicles. For example, one or more sensors 108 may be positioned, pointed, or both such that the sensors are better suited to detect the wheels or tires of a vehicle. In this case, the sensors 108 may be spaced closer together corresponding to where the wheels or tires are likely to be located when a vehicle is parked. Of course, the sensors 108 may be configured or positioned to detect other portions of a vehicle.

Each parking locator 104 may be configured by an install technician or others for the number and type of sensors 108 and the position and alignment of the sensors for detection of motor vehicles. For example, sensors 108 may be adjusted, added, or removed by a technician as desired. In addition, sensors 108 may be realigned or replaced to ensure that the parking locator 104 continues to function properly.

In one or more embodiments, a logic device 504 may be provided. Generally the logic device 504 receives sensor information from one or more sensors 108. Sensor information may be thought of as the data or readings that the sensors 108 output. The logic device 504 may then interpret this information to determine whether a motor vehicle is present within a parking space. The presence of a vehicle may then be transmitted as parking information to other devices, drivers, or others.

Though the parking locator and its elements such as but not limited to the logic device, sensors, and processor, are generally described herein as detecting the presence of an object or vehicle, it is noted that the absence of an object or vehicle is also detected by the fact that not detecting an object or vehicle implies that the same is not present or absent. Thus, in some embodiments, the absence of an object or vehicle may be communicated simply by not communicating that an object or vehicle is present. Of course, the absence of a vehicle may be communicated as well. For example, the sensors or logic device of the invention may communicate information indicating the absence of an object or vehicle when an object or vehicle is not detected.

It is noted that the logic device 504 may be configured to communicate the presence of a vehicle even if the vehicle is only partially within a parking space. In one or more embodiments, the logic device 504 may communicate that an obstruction is present if a vehicle or other object is partially within a parking space.

Sensor information may be interpreted by a logic device 504 to determine the presence of a motor vehicle in various ways. For example, if one or more of the sensors 108 detect the presence of an object, the logic device 504 may communicate that there is a vehicle present. Of course, the logic device 504 may be configured to communicate that a vehicle is present if a specific number of sensors detect an object.

The logic device 504 may be held within the parking locator such as for example, within the parking locator's body or beneath the parking locator's body. In this manner, the logic device 504 is protected from the elements, tampering, and from physical damage by the parking locator's body. It is contemplated that one or more covers removably attached to the body or one or more removable portions of the body may be used to allow the logic device 504 to be accessed for maintenance, replacement, adjustment, configuration, or other reasons.

Figure 5:
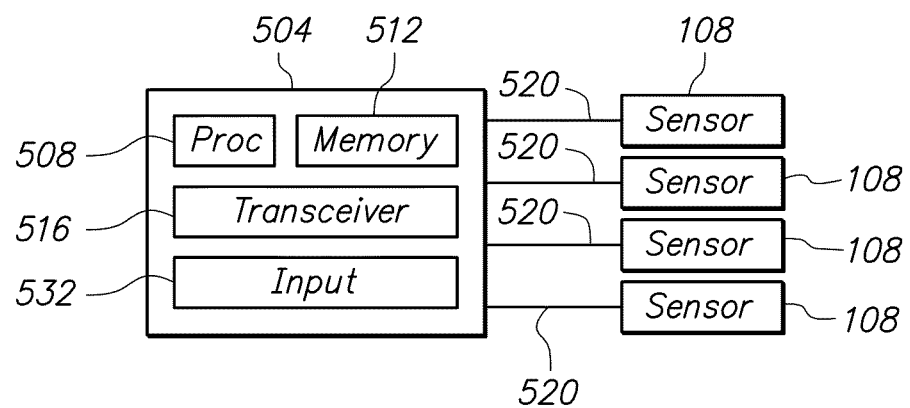
FIG. 5 is a block diagram of a logic device according to an embodiment of the invention.

In one embodiment, the parking locator includes at least one transmitter configured to transmit information. In a preferred embodiment, as the exemplary embodiment of FIG. 5 shows, the logic device 504 may comprise at least one transceiver 516, as well as one or more sensor inputs 532, one or more processors 508, and one or more memory devices 512. It is noted that a separate memory device 512 may not be required in all embodiments because the processor 508 may have memory or the configuration of the logic device 504 does not require it. In a preferred embodiment, the parking locator comprises a transceiver rather than just a transmitter, thus allowing the two way communications to and from the parking locator. Transmitted information may include parking information including information indicating the presence or absence of a motor vehicle to external devices, as will be described further below. Received information may comprise diagnostic or control instructions.

The transceiver 516 may utilize various communications links communicate, including those now known or later developed. For example, the transceiver 516 may be configured to communicate via a wired communication link comprising a physical cable such as electrical or optical cable. The transceiver 516 may also be configured to communicate via a wireless communication link. Various communications protocols, packet switched, circuit switched, or otherwise, now known or later developed, may be used with the invention as well. In one or more embodiments, the transceiver 516 may communicate via TCP/IP, GPRS, or text messaging.

It is noted that the transceiver 516 may be used to install, configure, and maintain the parking locator in some embodiments. For example, a technician or other personnel may connect to a parking locator through the transceiver 516 to setup or update configuration settings or initiate diagnostics. It is contemplated that this connection may also allow one or more sensors to be turned off (i.e. deactivated), turned on (i.e. activated), calibrated, or adjusted. For example, one or more damaged sensors 108 may be turned off to prevent false readings. In addition, one or more sensors 108 may be calibrated or adjusted such as by increasing or decreasing the strength of their detection beams, if applicable, or by increasing or decreasing their sensitivity. It is noted that this connection allows technicians or other personnel to remotely perform these functions. Of course, these functions may be performed through the transceiver 516 locally as well, such as by connecting a laptop or the like directly to the parking locator.

In some embodiments, the transceiver 516 may be configured to control the tower light 124 illustrated in FIG. 1. In these embodiments, the transceiver 516 may be configured to send a signal corresponding to the light, color, or both that should be displayed or emitted by the tower light. It is noted that a separate transceiver 516 or other interface configured to control the tower light may be provided as part of the logic device in one or more embodiments.

One or more sensor inputs 532 or another interface may also be included in the logic device 504. Generally, a sensor input 532 allows data outputted by one or more sensors 108 to be received by the other components of the logic device 504. For example, the sensor input 532 may be a terminal or other connector through which the output leads or connectors 520 of a sensor 108 may be connected. It is contemplated that each sensor input 532 may be selected to correspond to the output of one or more sensors 108. For example, a sensor input 532 may be configured to accept a particular optical or electrical connection from a sensor 108. In some embodiments, the sensor input 532 may be configured to accept wireless transmissions from one or more sensors 108.

In one embodiment, the sensor input 532 may translate data from a sensor 108 from one format or type to another. For example, an optical signal may be translated into an electrical signal, or one data format may be translated into another data format. The advantage of this capability is that a variety of sensor information may be translated by the sensor input 532 so that it is of a format or type that the one or more processors 508 of the logic device 504 can utilize. Of course this is not necessary in all embodiments, as the processor 508 or sensors 108 may be configured such that translation of sensor information is not required.

The one or more processors 508 may be simple electronic circuits or may be a more complex device such as a microprocessor. It is contemplated that any electronic device or component, now known or later developed, capable of receiving and interpreting input from the one or more sensors 108 may be used as a processor 508.

As stated above, the logic device may be configured to determine the presence of a vehicle within a parking space. In one or more embodiments, the one or more processors 508 may be used to make this determination. For example, a processor 508 may interpret sensor information from one or more sensors 108 to determine the presence of a motor vehicle within a parking space. For example, if only one sensor 108 detects the presence of an object, the processor 508 may determine that there may be an obstruction, but that no motor vehicle is present. However, if more than one of the sensors 108 detect the presence of an object, the processor 508 may determine that a motor vehicle is present. In one embodiment, each sensor 108 will detect an object, if such object is present, and the logic device's processor 508 will determine whether the object is a motor vehicle depending on the location of the sensors and the number of sensors detecting an object. It is noted that in some embodiments, the detection of an object by a single sensor 108 may be sufficient for the processor 508 to determine that a vehicle is present.

It is contemplated that the processor 508 may be configured to determine whether a motor vehicle is present in other ways as well. For example, the processor 508 may execute one or more image, sound, or other pattern recognition algorithms on the sensor data to determine the presence or absence of a vehicle. These algorithms may be stored as machine readable code on one or more memory devices 512 of the logic device 504 in one or more embodiments. As stated, memory devices 512 are not necessary in all embodiments because the processor 508 may be configured to perform these algorithms such as in the case of an application specific integrated circuit (ASIC), a field-programmable grid array (FPGA), or other specialized microprocessor.

In one or more embodiments, the one or more memory devices 512 may be used to store data as well. For example, the parking locator's configuration or other settings such as but not limited to its location on the lot, the configuration of its sensors, and its communication settings may be stored on a memory device 512. In addition, a log containing a record of when motor vehicles are present or absent may be stored on a memory device 512. This is advantageous in that this information may be used to plan additional parking capacity, conduct diagnostics on parking locators, or determine the price of parking, among other things.

Figure 6:
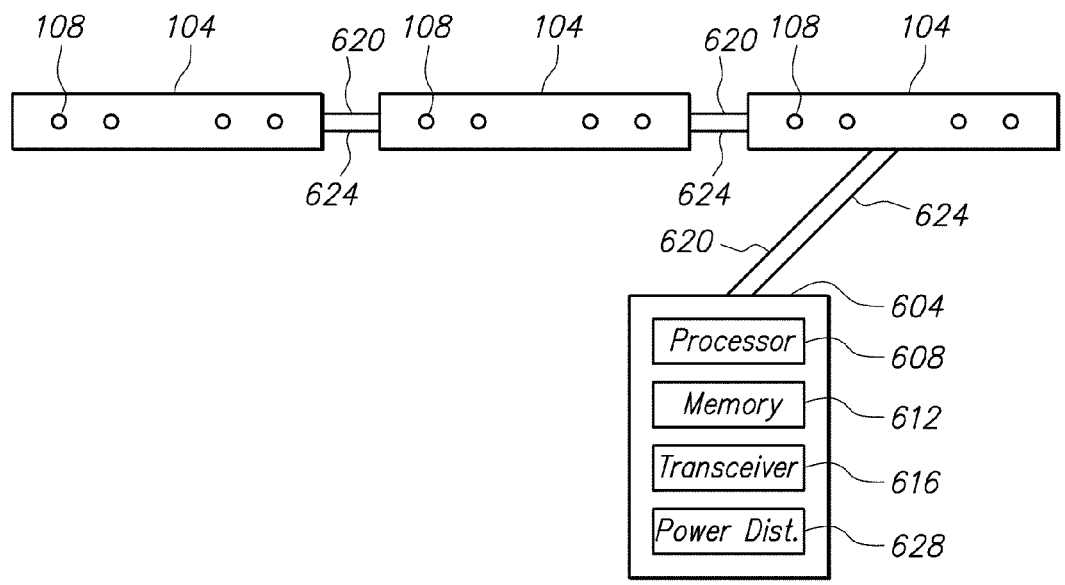
FIG. 6 is a block diagram of a plurality of parking locators connected in a daisy chain according to an embodiment of the invention.

FIG. 6 shows a plurality of parking locators 104 connected by power cables 620 and communications cables 624. Generally, the power cables 620 are used to provide power to each parking locator 104 while the communications cables 624 allow each parking locator to transmit data, receive data, or both. It is noted that the power cables 620 and communications cables 624 may be within a single cable having one or more conductors in some embodiments. In addition, it is contemplated that additional cables such as redundant power cables 620 or redundant communications cables 624 may be included in some embodiments as well.

It is contemplated that a power cable 620 may be any cable though which power can be provided to one or more parking locators 104, and that a communications cable 624 may be any cable through which data can be transmitted, received, or both by one or more parking locators 104. In one or more embodiments, the communications cables 624 may be standard network cables such as but not limited to Ethernet, coaxial, or optical cables. It is noted that in embodiments where the parking locator 104 may communicate wirelessly, such as through a wireless transceiver, communications cables 624 may not be provided. It is contemplated that a parking locator 104 may be solar or battery powered in one or more embodiments. In these embodiments, power cables 620 may not be required but may be used to power parking locators 104 if solar or battery power is inadequate.

In the embodiment shown in FIG. 6, a plurality of parking locators 104 are connected in a daisy chain configuration wherein the power and data input to a second parking locator is routed from a first apparatus while a third parking locator connects to the power and data output of the second parking locator. Of course, it is contemplated that each parking locator may be directly connected to a power source for power, to an external device to transmit and receive data, or both in one or more embodiments. The number of parking locators 104 that may be connected in a daisy chain may be from 1 to n where n is defined by power and distance. It is preferable to organize the parking locators 104 in clusters associated with a particular location in order to provide the details required by a parking location system.

A control box 604 may be used to facilitate daisy chaining a plurality of parking locators 104 in one or more embodiments. The control box may comprise a power distributor 628 which connects to and sends power from a power source to power the daisy chain of parking locators 104. The power source will typically be an electrical grid however it is contemplated that other power sources such as generators or batteries may be used as well. It is contemplated that the power distributor 628 may be configured to supply power to a particular number of parking locators 104 or a range of a number of parking locators. In one or more embodiments, the power distributor 628 may alter the power from the power source, such as but not limited to converting AC to DC, DC to AC, and increasing or decreasing voltage or current, prior to supplying power to the one or more parking locators 104.

It is contemplated that each or some of the parking locators 104 may be connected to a power source other than the power distributor 628 in some embodiments. For example, each parking locator 104 in a particular parking lot may be plugged into or connect to the electrical grid or other power source.

Generally, the control box 604 is connected to one or more parking locators 104 via one or more communications cables 624 or wirelessly to allow data to be communicated to and from each of the one or more parking locators. It is contemplated that the control box 604 be used to notify one or more drivers, parking attendants, other external or user devices, or people of the presence or absence of a motor vehicle at a particular parking locator. For example, in one or more embodiments, the control box 604 receives data indicating whether a particular parking locator 104 has detected or not detected the presence of a vehicle and communicates the same as parking information to one or more external or user devices.

Typically this occurs by the logic device within a parking locator 104 communicating the parking information comprising information indicating the presence or absence of a vehicle within its associated parking space to the control box 604. Of course, other parking information regarding a parking space may be collected by a parking locator's 104 sensors 108 and communicated to the control box 604 as well. In one embodiment, the parking information provided by a parking locator's 104 logic device may be communicated in the following format:

<Device Number>,<Status Code>,<Location>

Device Numbers may be numeric or alphanumeric codes which uniquely identify each parking locator 104. Of course, any indicator capable of uniquely identifying a parking locator 104 from a plurality of parking locators may be used as a Device Number. The Location may be a description, geographic coordinates, street name, parking space number, or any other indicator of the parking locator's location. It is noted that Location may not be communicated by a parking locator 104 in all embodiments because a separate record or database of locations indexed by each parking locator's Device Number may be kept and used to retrieve the location of a parking locator. Status codes generally indicate the presence or absence of a vehicle and may include specific information such as but not limited to the following examples:

1. Space Empty
2. Motor Bike Present
3. Small Motor Vehicle Present
4. Motor Vehicle Present
5. Unknown Obstruction Present
6. Apparatus Error
7. Other Status information The parking information may then be used by the control box 604 to communicate to one or more users or external devices the current status of one or more parking spaces. Communication of the status of particular parking spaces or of vacant parking spaces in an area may occur in various ways. For example, the control box 604 may be connected to a telephone line, the internet, cellular network, one or more displays or signs, or a combination thereof. Users may then call a number or send a request by text message to receive information regarding open or occupied parking spaces or look up this information on the internet or on a sign. It is contemplated that electronic signs may be posted near the entrance to a parking area or other visible area such that users (such as drivers) may easily see which spaces are open or occupied. The sign may direct users to open spaces such as by providing a map or directions to an open space, or by listing a number or other information that identifies the space.

The control box 604 may be configured to communicate parking information to users through one or more user devices of various types. In this manner, a wide variety of communication methods may be used. For example, users could receive notifications via text messaging, instant messaging, telephone calls, email, or a combination thereof on any device capable of displaying the same.

Figure 7:
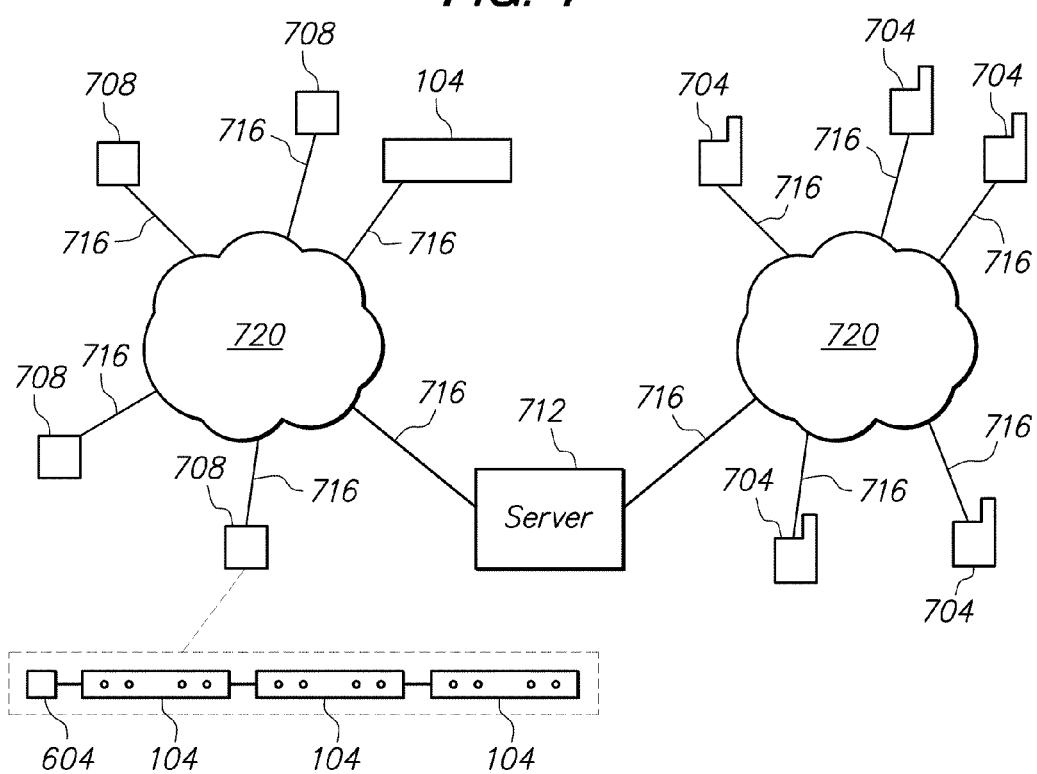
FIG. 7 is a block diagram of a parking locator system according to an embodiment of the invention.

FIG. 7 illustrates an embodiment of a parking locator system according to the invention. As shown in FIG. 7, the parking locator system is comprised of one or more parking locator clusters 708. As shown, each parking locator cluster 708 comprises one or more parking locators 104 connected in a daisy chain to a control box 604. Each cluster 708 may transmit parking information on a real-time basis to a location server 712 via a network 720. For example, the parking locators or parking locator clusters 708 may continuously transmit parking information to the location server 712. The location server 712, as described further below, may be configured to organize and store the received parking information and provide the parking information to one or more user devices 704.

These transmissions of information may occur via one or more wired or wireless communication links 716 and networks 720 utilizing various communication protocols. It is noted that in some embodiments, parking information may be transmitted when requested by a location server 712 rather than being transmitted on a real-time basis. For example, parking information may be requested by a location server 712 from one or more parking locators 104 or clusters 708 in response to a driver's or other person's request for parking information. Such a request may be made from a user device 704.

Though illustrated as two separate networks 720, it is contemplated that user devices 704, location servers 712, clusters 708, and individual parking locators 104 may communicate through a single network or multiple networks. It is also contemplated that the networks may be of different types. For example, communication may occur over the internet, telephone networks, cellular networks, as well as other wired or wireless networks. The type of network or networks used will depend on the communications requirements used by and with the invention herein.

In one embodiment, the communication between each cluster 708 and the location server 712 is accomplished through wireless communication links 716. In a preferred wireless embodiment, GPRS communication is used to facilitate communication between each cluster 708 and the location server 712. In another embodiment, the communication between each cluster 708 and the location server 712 is accomplished through wired communication links 716. In a preferred wired embodiment, the clusters 708 and the location server 712 communicate via TCP/IP or other internet protocol. In yet another embodiment, individual clusters 708 may communicate via different wired or wireless networks 720 such as GPRS networks, circuit switched networks, or packet switched networks (e.g. internet).

As stated, each cluster 708 comprises one or more parking locators 104 connected in a daisy chain to a control box 604. In this embodiment, each cluster 708 communicates via a communication link 716 through its control box 604. Also shown in FIG. 7 is a parking locator 104 configured to communicate directly to a location server 712 through a network 720. For example, the logic device of a parking locator 104 may be configured with an appropriate transceiver to allow direct communication of parking information to a location server 712 if desired.

The location server 712 may compile the collected information on a real-time, periodic, or other basis (e.g. as the information is requested by users) and organize the information based on location and time. This information may then be easily retrieved for users of the system. The location server 712 will typically be a server computer or personal computer having machine readable code configured to perform the functions described herein. However, it is noted that other devices capable of performing the functions herein may also be utilized with the invention.

In one embodiment, the location server 712 utilizes a database to organize and store parking information. The database may include the following data elements:

1) User Accounts to enable system and service access, which includes account type, name and address information, User device type, and user device configuration.

2) Network Configurations which include each parking apparatus, every transmitter device, location within a defined geographical area, and other configuration information 3) Wireless Network Information and Configuration 4) Support Personnel Accounts 5) Parking Device apparatus status 6) User location and status 7) Traffic Alerts 8) Traffic Information 9) City Fees and Payment Repository 10) Connection to financial institutions for payment services 11) Other related information and real-time status The account information such as User and Support Personnel Accounts may be used to allow or deny access to the information stored in the database. For example, User Accounts may have access to traffic and parking information while Support Personnel Accounts may have access to configuration and status information such as network information.

Thus, it can be seen that the location server 714 is advantageous in that it provides a central storage area, such as the database described above, for parking information. In addition, other related information may be stored and accessed. Further, the location server 714 allows access to such information to be controlled by one or more User, Support Personnel, or other accounts, and provides a single device from which such account holders may access parking and related information. As stated, it is contemplated that the location server 714 may be a computer and thus may be easily programmed to include additional functionality and connected to a wide variety of networks and devices as necessary.

Similar to individual parking locators 104 or groups of parking locators, the parking locator system provides a service to the user that provides the user with available parking space information within a particular location or region. In one embodiment, the user may send a text message (e.g. SMS message from a cell phone) to a specific short code to request the closest available empty parking space from the system. In another embodiment, a user could send a text message to a particular short code assigned to the parking locator system to request all available spaces. It can thus be seen that a variety of text messages may be sent to the parking locator system and that the system may be configured to provide specific information as requested by a particular text message. An example of such text message requests could look as follows:

"Closest Space?" (to request the closest space)

"All Spaces?" (to request all available spaces within an area)

A user may provide his or her current location to the system in the text message or that the user's phone may provide the user's current location. For example, the phone may provide GPS coordinates to the system or the user may enter cross streets, zip codes, coordinates, or other location information in a text message. Such a request could look as follows:

"Closest Space to Main St. and 4th St.?"

In response to a request, the parking locator system may be configured to return a text message to the user, providing driving directions to the open space. For example:

"Space available on 4th St. between Main St. and River St."

The system may be configured to send map or other visual information indicating the location of one or more spots, or such information may be synchronized to a map or other data. For example, the system may send a .jpg map showing streets and the location of open parking spots to a user device, such as a phone, for display.

It is contemplated that the parking locator system may be connected to other user devices such as navigation devices. For example, in-car or handheld GPS/direction systems may be used. The status of parking spaces, preferably open spaces, may then be displayed on a map displayed by the navigation device. In addition, the system may include a GPS system including radio communication and may inform the user specifically about the availability of parking within a specific area. Additional options may include the capability of a GPS enabled user device to also provide integrated information regarding accidents or traffic jams.

It is noted that user devices, which are generally devices capable of displaying or presenting parking information to a user, may be of various types. For example, in addition to cell phones and navigation devices, PDAs, portable media players, electronic signs, portable game machines, internet terminals, and computers may be used to request and view parking information. It is contemplated that these devices may request and display parking information through various interfaces. For example, some user devices may utilize a web interface or other software interface to allow users to make requests of parking information and to display the same to users.

In addition, a tower light, such as described above with respect to FIG. 1, may be used to display parking information. In this situation the tower light may be configured as a user device in that the tower light would communicate with or be controlled by a location server or a control box without being connected to a parking locator or any logic device therein. It is contemplated that a tower light may be associated with a parking space rather than attached to the parking locator. For example, the tower light may be attached to the parking space itself or may be mounted on a pole extending upward from the parking space. As stated, such pole may be of varying heights as desired for visibility, aesthetic, or other reasons.

In one or more embodiments, users may be charged for parking information provided by the invention. Many methods for charging the users of the system are possible, including monthly fees, subscriptions, per transaction fees, subsidized by government or advertising, location specific, regional specific, etc. . . . . . It is noted that any method of accepting payment, now known or later developed may be used with the invention.

In one embodiment, the location server may be configured to collect a fee or payment and check that a user has paid before communicating parking information to the user. Each user may be identified by his or her phone number, a username and password, or other identifying information. It is contemplated that where a location server is not provided, a control box may be configured to collect payment and check that a user has paid before communicating information to the user.

The parking locator system may be configured to support a plurality of financial methods for accessing the system and using the service. For example, in many large cities within Europe, drivers are forced by cities to pay for access to city centers to alleviate environmental problems. A cell phone may be used as an electronic purse communicating to the system using protocols such as GPRS to make payment for access to the city. It is thus contemplated that a cell phone may similarly be used to make payment for access to the parking locator system. Such payment may include a single payment for a single day, multiple days, a month, multiple months, or other time period as desired. Further, as detailed below, payment may also be automated via a vehicle identification system.

In some embodiments, the system may support time based access where the user simply pays for the time in which they are within a city center or other area and wish to use the parking locator system. In other embodiments, subscription based access may be supported where the user of the system pays a monthly fee to utilize the system to access parking information. It is contemplated that the system may allow payments for access to other services the system is capable of providing including but not limited to traffic information and traffic alert services. There may also be a software development kit (SDK) provided for third parties to add additional services or features to the system such as retail shopping information, entertainment information, restaurant information, and special offers and services.

It is contemplated that the system may include identified users and their user information, and identified vehicles and vehicle information. First, vehicles may be identified by one or more identifiers, such as tags. In general, a tag may comprise vehicle identifying information on or associated with a physical medium or device, or otherwise capable of being transmitted or provided to and/or from the vehicle. For example, the vehicle identifying information may be a code or other sequence of information capable of uniquely identifying one or a group of vehicles. Such a vehicle may have a tag comprising one or more barcodes attached thereto. A vehicle may also have an RFID tag attached thereto in one or more embodiments. Other types of tags may also be used. In fact, any device capable of identifying a vehicle to a parking locator may be used. For example, a radio frequency, infrared, acoustic, or other emitter configured to transmit a code or other information identifying a vehicle may be used as a tag.

One or more parking locator sensors may be configured to read these tags to identify a vehicle. Such sensors may include or may be in addition to those described above for detecting the presence of a vehicle in a parking space. Such sensors may also be associated with a parking header or similar mount, or may be separate there from. For example, a sensor may emit a radio frequency signal to read vehicle identifying information from an RFID tag. A sensor may also read vehicle identifying information from a tag by receiving such information without first emitting radio frequency or other signals. It is contemplated that in some embodiments, a vehicle may be detected through detection of a tag alone. Typically however, the parking locators will be capable of detecting the presence of vehicles with or without tags, as in the manners detailed above. Advantageously, however, identification of a particular vehicle (rather than the mere presence of a vehicle) provides various additional advantages, as detailed herein.

Tags may be distributed to users in various ways. In one embodiment, a user may obtain a tag from a designated location such as at a kiosk, vending machine, or office. Of course, tags may be obtained online, through the mail, or by phone, as well as in other ways. Generally, a user will provide user information identifying the user, which information is associated with the tag. Such user information might include one or more of user name, address, phone number, credit card number, drivers license number, and vehicle identification information. In one embodiment, a user may also associate funds with the tag, such as by depositing funds or otherwise providing a method of payment such as cash, check, or a credit card or account number in some embodiments. It is contemplated that a user or other personnel may attach or associate tags to vehicles.

This user information may be stored in a database, such as disclosed above, or in a separate patron database. The database itself may be stored on one or more servers. For example, the database may be stored on one or more location servers of a parking locator system. Once a user's information has been stored in a database and/or pays any required subscription fees, the user may be considered a subscriber of the system and other transactions (such as obtaining other tags) may be associated with that information. Of course, a user may later be asked for a username and password or other identification to verify the user's identity.

It is contemplated that other user information may be stored in the database as well. For example, a user may provide information regarding his or her daily or other commute to and from work or other locations. This information will generally include a starting location and a destination location as well as desired or required times of departure, arrival, or both. In some embodiments, information regarding the route between the starting and destination location may be included.

Once stored in a database, the system of the invention may review the user's commute to automatically provide traffic or parking information to the user. For example, if road work, an accident, construction, or traffic has or is occurring along a user's commute, this information may be automatically communicated to the user, such as through a user device. In addition, parking information identifying one or more unoccupied parking spaces may be automatically communicated to the user. This information may be communicated automatically at or prior to the user's departure or arrival times or may be communicated automatically upon the user's vehicle entering a particular area as determined by a GPS device or other vehicle location system. This information may also be retrieved as desired by a user such as by accessing the information through a user device.

In the database, individual tags may be associated with a particular user's user information. For example, each tag may have an identifier which may be associated with the user's information, or the vehicle identifying information contained on each tag may be associated with the user's information. In this manner the holder or owner of each tag may be later determined. If a tag expires, is damaged, is lost, or otherwise becomes unusable, such tag may be removed from the database or may be marked as no longer in use. Tags may also be marked in the database as suspended such as in the case where a user fails to pay one or more charges. In this manner, the state of issued tags may be managed through the database.

In one or more embodiments, users may elect to have anonymous tags. Generally, anonymous tags will be configured to identify individual or groups of vehicles without identifying or being associated with a user. Such tags may not provide all of the same advantages to a user as a tag which is user identified. However, such a tag may have various of the benefits detailed herein. For example, even though a user is not identified, information may be transmitted to a tagged vehicle regarding traffic, parking or other information.

The ability to identify individual or groups of vehicles provides several advantages. For example, the system may automatically charge an identified vehicle's owner for parking in certain parking spaces or for driving to or through certain areas. This may occur by the parking locator or parking locator system reading the vehicle's tag and using a database to look up the user who holds or owns the tag. The charges may then be charged against deposited funds, or to a bank or credit card associated with the tag. In this manner, a user may be automatically billed or charged for parking, toll roads, or other services. The system may otherwise charge users for various of the services provided thereby, such as for providing parking or traffic information and/or the user networking information detailed below. Such a fee may be, for example, a subscription fee.

It is contemplated that the system may be used to eliminate one or more parking meters or similar devices in this manner. For example, one or more parking spaces, in parking lots, parking garages, or other parking areas may be configured to identify a car by its tag when parked. Rather than requiring a driver or other person to insert a coin or other payment, the system may automatically charge an account associated with the vehicle. It is noted that the account to be charged may be stored in the vehicle's tag in one or more embodiments. In this manner, the account may be charged without the system retrieving the account information from an external database or other data source. The account may be any account that allows funds to be transferred to pay for parking. For example, the account may be a credit card, checking, savings, debit, prepaid, or other account.

Another advantage is that users may establish a social network with other users. For example, users may elect to allow other users to see where their car is parked. In this manner, users may determine if any of their friends or acquaintances are in the same area. In addition, users may make new friends and acquaintances from other users who are in the same area or who frequent the same areas. For example, one or more users who do not know each other may commute to the same place for work or shop at the same place. It is noted that in one or more embodiments, a user may choose which other users may see where their car is parked.

In one embodiment, the system may even analyze parking information to provide offers to users. For example, the system may detect a particular vehicle parked in an area on a regular basis. The system may send a notice to the user that the user could save money by parking in another location.

Users may also elect to allow other users to see their contact information, their commutes, or both in one or more embodiments. In this manner, users may communicate with each other, such as through the phone, instant messaging, online postings, email, or the like. Users may also use this feature to meet new people, to share or arrange commutes or car pools, or both. It is noted that in one or more embodiments, a user may choose which other users may see their contact information.

The parking locator system may include a server to facilitate social networking functions, or an existing server, such as the location server, may be used to facilitate social networking functions. This server may be configured to provide access to user information to one or more users. In one embodiment, the server provides a web interface through which users may see and locate other users, input their commutes and information related to their commutes, as well as communicate with other users such as by posting messages on a bulletin board type system or by sending messages directly to one or more other users. The server may be accessed through one or more user devices. It is contemplated that non-web interfaces may be provided as well. For example, the server may include a voice interface. In addition, an application or software may be configured to access the server as well. For example, a user device such as a GPS device may include software configured to communicate with the server. In this manner, the location of other users' contact information and parking locations may be shown directly on a user device.

In one embodiment, users may be allowed to establish a network of private friends. Each user may establish this network by selecting one or more other users for his or her private network of friends. Within a network, users may share commute information, may see where a friend's car is parked such as to locate a friend, and privately communicate. Users outside a network will typically not be allowed to see the information users have communicated or shared within the network.

It is contemplated that users may use their friend's networks to arrange a commute or car pool with a larger pool of users. For example, users may be allowed to see the commutes of people who are not in their friend network, but are in a friend's friend network. In this manner, shared commutes or car pools may be arranged between people who are known by other people within a user's network rather than between complete strangers. Users may be given discounts or benefits, such as free or discounted parking or reduced subscription fees, for arranging or participating in shared commutes or car pools. As with above, an additional server or an existing server may be used in the parking locator system to facilitate the network of private friends functionality such as by providing a web or other user accessible interface. It is noted that the same server may be used to provide the network of private friends functionality as well as social networking functionality. Of course, separate servers may be used as well.

In one or more embodiments, the parking locator system may provide tools and services to municipalities to ensure better control and better management of parking areas. Control and management may be implemented at a variety of parking areas. For example, there may be different types of parking within the same town or other location, such as "blue area" parking, "rotary" parking, and "mixed" parking. Each type of parking area may have different characteristics.

For instance, parking in a blue area may be regulated in a particular way. In one embodiment, vehicles equipped with a parking disk may be parked in a defined portion of the blue area. The maximum duration for parking may vary between 90 minutes and two hours as set by a municipality or other authority. Of course, other durations may be used. Beyond the authorized period, the vehicle should be moved or face a fine. Blue area parking may be well suited for small and medium sized cities where parking problems don't require the implementation a heavier or more complex system.

Rotary parking may be reserved for shopping zones. In general, parking may be limited to two consecutive hours without the possibility to obtain additional time. For example, a user would be prevented from obtaining another ticket, for additional time, at a ticket machine.

Hourly pricing may vary according to the location of the rotary parking. For example, in a European locality, pricing may vary between one to three Euros per hour (payable per quarter of an hour) according to the district where the parking is located. In one embodiment, residents may be permitted to park at rotary parking areas, but only outside of the paying hours. Various parameters may be taken into account in the configuration of rotary parking areas. For example, price, maximum duration for parking, or parking period (e.g. monthly, daily, hourly) may be taken into account.

Mixed parking generally combines two types of parking, and may occupy residential areas in one or more embodiments. In one embodiment, mixed parking may comprise parking for residents, parking for visitors, or both. To illustrate, in Paris, the price may be 0.5 € per day (2.5 € per week) for district residents holding a resident card. Visitor parking may be treated as rotary are parking. For example, visitor parking may be for two hours maximum at the hourly or other rate for a rotary parking area.

Various parameters may be taken into consideration to define the mixed parking areas. For example, parking for residents may take into account the fare for various durations such as the fare for a day, week, fortnight, or other period. Other parameters may be taken into account as well. For instance, pollution levels may be taken into account. When pollution levels are high, parking fare may be free or zero to encourage drivers not to use their vehicle. Parking for visitors may by defined by parameters such as price, maximum parking duration, parking period (e.g. monthly, daily, hourly), or other parameters.

Better control and better management of parking areas provides numerous benefits. For example, it fosters more rapid rotation and sharing the public space between parked motorists and motorists anxious to park. It should ameliorate circulation conditions and provide better access to the city center. This is currently a problem because of the explosion of the number of vehicles and of the circulation of vehicles while searching for a parking space. For example, in some locations, around 35% of traffic may be related to searching for a place to park.

Better control and management also allows better surveillance of the parking areas for tax and fee collection. In turn, this surveillance facilitates control over parking areas. Currently, the size of parking lots as well as the number of parking spaces may make achieving this objective difficult. According to a study carried out in France for example, only the equivalent of two hours of parking fees/taxes is collected out of a possible eight or nine hours.

Increased collection of fees/taxes provides the benefit of increased revenue. In fact, this increase may allow self-financing of a parking locator system, which is a highly desirable advantage for many municipalities. In fact, the collected revenues may be linked to parking construction and therefore increase the places to offer to the population for parking.

Use of the parking locator system also protects public spaces by helping to prevent unauthorized or illegal parking at empty public spaces that may not be designated for vehicle parking. Currently, this is a problem because of an explosion in the number of vehicles as well as a shortage in parking spaces. This uncontrolled and unauthorized parking is a serious problem which tremendously disrupts traffic circulation.

In one or more embodiments, the better control and management of parking spaces, dissuading users from cheating, increased parking revenue collections, and optimizing the parking agent's work in parking tax settlement described herein may be provided as a park payment control service. It is contemplated that the park payment control service may be implemented using the parking locator system described herein.

The park payment control service will not only help ensure control of different types of existing parking but also create new parking more in keeping with the current environmental constraints (blocking in the city centre, environment, etc. . . . ). The idea is to do contradictory control between the payments made and actual parking duration. In case an anomaly is detected, the service may automatically inform parking agents so they may intervene.

In one or more embodiments, the park payment control service may be configured to ensure drivers respect parking rules by ensuring coherence between the defined parking rules for the area, the parking duration, and the collected amounts. The service may utilize hardware or equipment comprising a communication interface in order to collect the information related to user payments. The hardware or equipment may execute machine readable code having instructions to provide aspects of the park payment control service. The instructions may be stored on a memory device or hardwired into the hardware or equipment itself. In one or more embodiments, the hardware or equipment may be one or more components of a parking locator system as described herein.

In some embodiments, the service utilizes a communications interface to allow communication between parking meters/ticket machines and an interface card. The interface card may be in a server or other component of a parking locator system. In order to minimize the modifications at the parking meters/ticket machines, the communication method used may be a master/slave type communications scheme.

In operation, the parking meters/ticket machines may send a message to the interface card each time a user pays its parking right. The control service may then monitor parking according to parking rules, notifying parking agents of anomalies or violations. Notification may occur electronically such as through audio, text or other message. In one embodiment, a parking agent may receive notifications on his or her Pocket PC.

Figure 8:
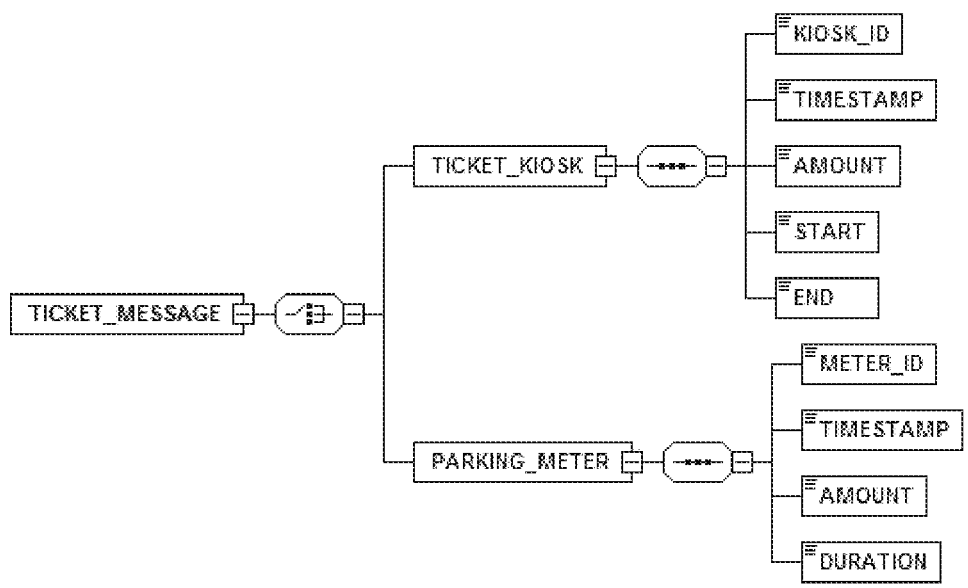
FIG. 8 is a block diagram of an exchange protocol according to an embodiment of the invention.

In order to ensure the information exchange between the peripherals and the interface card, an exchange protocol or data format may be defined. For example, FIG. 8 illustrates and exemplary XML descriptor for the exchange of information. As can be seen, the XML descriptor defines messages available according to the type of peripheral. It will be understood that various exchange protocols or data formats may be used to communicate information as well.

The parking meter/ticket machine connection to the parking locator system offers real time management and enhances the management of:

The rise in real time of the turnover
Monitoring of the ticket machines for various conditions
Paper low
Currency full
Loss of connection
Malfunction
Ticket machine version It is contemplated that the park payment control service may be implemented in one or more portions or modules. For instance, a business rules engine may be used to control the coherence between the parking duration, the payments made, and the parking rules. A group management module configured to better locate vehicles not respecting the parking rules (it is the case of ticket machines) may be provided as well. One or more alarms may be set off and notification to the agents in charge of controlling the parking payment may be given in some embodiments. These modules may be implemented as machine readable code in one or more embodiments. The modules may also be hardwired into the hardware of a parking locator system as well.

This control module is decentralized at the interface board level of the parking locator network in order to minimize the traffic at the network level. In some embodiments, each ticket machine may manage between 50 to 100 parking lots. In this manner, the lot processing is more rapid and requires less power than if it was done at the server level. Moreover in some cases, it is desirable to be able to install the interface board in the ticket machine itself.

The business rule engine may execute one or more execution rules in a production environment. The execution rules may be based on a legal jurisdiction, a business policy or other sources.

The terms of control may vary according to the parking types as discussed above. In one or more embodiments, the business rules engine may be in charge of defining and implementing terms of control and ensuring that they are being respected. The following illustrates exemplary terms of control for different parking types.

The Blue Areas:
Control of arrivals and departures
Alarms in case of exceeding the authorized time
Rotary parking
Control of arrivals and departures
Alarm set off if the taking a ticket is not done within a predetermined number of minutes
Comparing the departures to tickets
Alarms in case of exceeding the authorized time
  Link between the tickets time and the parking time
  Exceeding the maximum time for authorized parking
Resident parking
Validation of the parking subscriber
  Online control of the subscription validity (duration)
  Control of the subscriber's use within the geographic area
  Freezing the place while it is occupied
  Releasing the place once the car leaves it It is noted that the terms of control or rules may be independent of the applications or modules which execute the terms of control or rules. In other words the terms of control or rules may be externalized from the business rules engine or other module of the service. This allows easy modification of the terms of control or rules when desired.

In one or more embodiments, the business rules engine may be defined as follows.
  Controlling the coherence between active tickets and occupied places. Their number should be always equal.
  If there are fewer tickets than occupied places, the service does not need to pick up tickets when a vehicle leaves.
  Arrival of a vehicle on a parking place. Timeout of a predetermined number of minutes to buy a ticket may be provided. If no ticket is issued, then an alarm is set off.
  Exceeding the legal duration of parking may cause an alarm to be set off.
  When a car leaves the parking, the service may cancel the ticket which may or may not have a small amount of time remaining.
  In case of an alarm,
    Fine: takes out the space from the control process till the departure of a vehicle occupying the place
    Possibility of reactivating an alarm for having exceeded the legal authorized duration
    Identification of the parking lots thanks to the number positioned at the level of the parking lots
  In case of a booking without alarm, a parking agent may notify the system which cancels the ticket with the shortest remaining duration possible if the number of tickets is equivalent to the number of occupied spaces.
  If a ticket expires and the vehicle is not moving, an alarm may be set off.
  Adding a ticket without moving the car, replacement of a ticket which duration is close to the expiration or cancellation of an alarm for less than 5 minutes.

In the case of parking management through a ticket machine, the issued tickets may be associated to an area and to a vehicle but not to a parking space, defined as it is the case by the ticket machine. To detect parking anomalies or violations, the number of issued tickets for an area may be monitored or recorded. Even if it is possible to detect anomalies, the investigation area can be important according to the number of parking spaces associated to the ticket machine.

In general, a ticket machine ensures the management of 50-100 parking spaces. This number is understandable since this solution forces the users to move as far as the kiosk. Of course, a ticket machine may ensure management of fewer or more parking spaces. It is noted that due to the privacy law in force in many countries, the system may be anonymous in one or more embodiments.

Some ticket machines of time stamp ask the users during the payment to enter the parking space (or parking lot) number over which his or her car is parked. In that context, the system should control the coherence between the time paid and the time during which the parking lot or space has been occupied:
  If the parking duration exceeds the amount paid, an agent may be notified through an alarm message.
  If the user leaves the parking lot before the end of the parking duration, the meter may be cleared and this constitutes a profit for the parking operator.

In some embodiments, in order to facilitate the parking agents' work by reducing their intervention area and optimizing their progress within the area to be controlled, it may be necessary to define the groups of vehicles. A group of vehicles is defined as a set of vehicles which come to park in a parking area for a period of time. The period of time may be defined in a parameter stored in the memory or hardwired into the parking locator system. If many vehicles come to park in the interval defined by this parameter, it may be difficult to associate the tickets to a parking space. The notion of groups of vehicles allows for automatic creation of a link between the tickets and the parking spaces which have just been occupied.

As soon as a parking space is occupied, the space used (group of captors) is linked to a group in progress. If no group is active, a new group is created and it will be active during the period of time defined by the parameter. A group can be made of only one vehicle if there is only one which has come to park in the area during the period of time defined by the parameter. The notion of groups allows reducing the search zone during the anomaly detection. More precisely, when there is no car movement and a ticket comes to its end, the cars which belong to the related group of cars and the ticket are first targeted.

A group of vehicles may be closed when the period of time defined by the parameter comes to an end. No additional parking spaces may be added to this group after it has closed. If the number of tickets is insufficient within the group (e.g. one or more users haven't been issued a ticket at the ticket machines) an alarm may be set off at the group level. The arrival order of vehicles could be then indicated/used to refine the fraud localization.

Even though it may not be possible to add parking places to a validated group, the group will evolve according to possible departures (places which are freed). The group may be destroyed when all the spaces, of which the group is made of, are freed. If a space is freed and occupied again, it may be allocated to another group, unless it is re-occupied before the period of time defined by the parameter has expired.

The implementation of these groups associated to business rules engine allows for the creation of different types of alarms. For example:
  Alarm of place: the parking duration is too long for a given place
  Alarm of group: there are not enough tickets issued in a given time for a group of occupied places.

Alarm of area: exceeding the parking duration in regards to issued tickets (control can be done in a global way or within groups—which can allow a better search direction for unauthorized parking)

It is contemplated that the parking locator system may enable the registration of parking agents' control (time input indicated on the ticket). This would allow refining the control algorithms and targeting better the area/group alarms. When an Agent is notified by an alarm message, he has the possibility during the control to freeze the parking lot till the car leaves the parking lot. So thus, it is not taken into account in the control process till the parking lot is vacant again.

Figure 9:
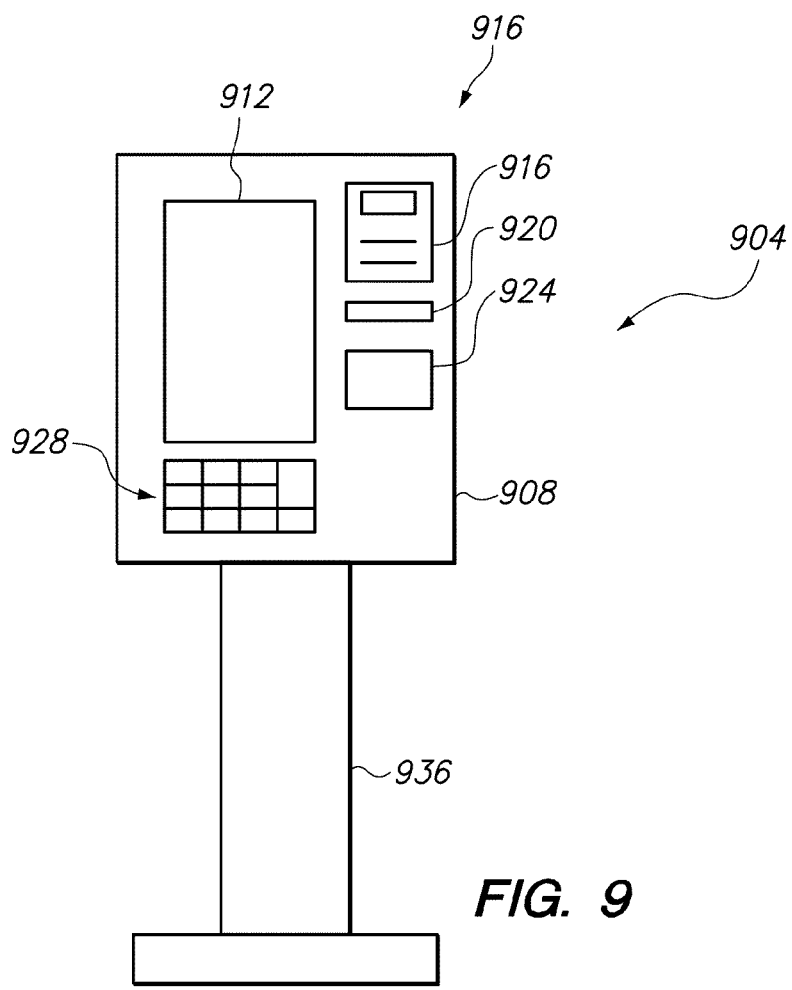
FIG. 9 is a block diagram of a parking kiosk according to an embodiment of the invention.

Additional functionality may be provided through use of one or more parking kiosks with the parking locator system. An exemplary parking kiosk is illustrated in FIG. 9. As shown, the parking kiosk 904 comprises an enclosure 908 which houses or supports various components of the parking kiosk. The enclosure 908 may be elevated by a stand 936 in some embodiments for convenience and accessibility. Though referred to herein as a "kiosk" it will become apparent from the disclosure herein that the "parking kiosk" may be configured as a parking meter, other kiosk, ATM, or other publicly accessible terminal in some embodiments.

The parking kiosk 904 may have a variety of components to perform its function. As shown for example, the parking kiosk 904 comprises a display 912, one or more buttons 928 or other input devices for user input, a payment acceptor 916, and a printer 920. The parking kiosk 904 may also include a display area 924 for displaying instructions, advertising, information, and the like. As will be discussed further below, the printer 920 is generally used to provide printed material to a user, however it will be understood that a ticket or other media dispenser may be used instead of or in addition to the printer 920. In addition to a display 924, printer 920, or media dispenser, it is noted that other devices capable of presenting information to a user may be used, such as character-based readouts, speakers, tactile interfaces, and the like.

A parking kiosk 904 may be associated with one or more parking spaces in one or more embodiments. For example, a parking kiosk 904 may be located near a plurality of parking locators, receive/send parking information from a plurality of parking locators, or both. In this manner, a single parking kiosk 904 may accept payment of parking fees relative to a plurality of parking spaces. This also allows the parking kiosk 904 to print, dispense, deliver, distribute or otherwise present receipts and other materials at or near the plurality of parking spaces. Each parking space may have its own parking kiosk 904 in some embodiments. The parking kiosk 904 may resemble a parking meter or the like in such embodiments.

In general, the parking kiosk 904 takes or accepts payment allowing a driver to legally park for a period of time. Payment may be accepted in various ways now known or later developed. As shown for example, the kiosk 904 includes a payment acceptor 916 capable of accepting coins, paper currency, and credit cards and the like. It is contemplated that the payment acceptor 916 may include a wireless interface to accept payment via RFID or wireless cards, stored value cards or devices, and the like. As used herein, stored value card or device refers to a card or device which may be used to transfer credit, currency, or other value to an account. In general, stored value cards or devices allow payment transactions through wireless near field communication.

Once payment is made, the parking kiosk 904 may provide a receipt. The receipt may be tangible, such as on a piece of paper, electronic, or both. For example, the receipt may be printed by the kiosk's printer 920, stored in a memory or a database, or a combination thereof. Traditionally, receipts are printed so that the driver may place or stick them visibly in the driver's vehicle. The kiosk 904 herein may provide an electronic receipt which does not require the use of paper. For example, a receipt may be emailed, sent by SMS or GPRS, or otherwise electronically transmitted to a user device. In one embodiment, the kiosk 904 may display a reference number, code, or other identifier that the driver may record in the event that there is a dispute regarding the legality of his or her parking.

The driver may provide input to the parking kiosk 904 via input buttons 928. This input may comprise payment information, user or vehicle identifying information, as well as other information. For example, the driver may input an address, zip code, or the like to show he or she is a valid credit card holder. In some embodiments, the driver may provide his or her vehicle license plate or other information regarding his or her vehicle. It is noted that in some embodiments, the parking kiosk 904 may receive user or vehicle identifying information from a parking locator. For example, the parking locator may read a tag associated with a vehicle, as discussed above, which identifies the vehicle, its driver/owner, or both. If identified, the driver need not enter identifying information in one or more embodiments.

The display 912 of the parking kiosk 904 may be used to display or present information to a driver to aid in use of the kiosk or to provide other information to the driver. The driver may then provide input via the input buttons 928 in response to displayed information. For example, the display 912 may request specific information such as identifying information or payment information. The display 912 may also be used to display the amount the driver is paying and the amount of parking time the driver is receiving. The display 912 may also present advertising in some embodiments, such as advertising for nearby or local businesses. It is noted that the display 912 may be touch sensitive to collect input from the driver as well. It is contemplated that directions to various nearby businesses, attractions, restrooms, transportation hubs or stations, or the like may be requested and provided by the kiosk 904 via the display 912 in some embodiments.

Though not shown in FIG. 9, the parking kiosk 904 may also comprise one or more processors, storage devices, transceivers/communication devices, or a combination thereof in one or more embodiments. Like the transceivers described above, the kiosk's transceiver(s) allow the kiosk to communicate with other devices and in particular allows the kiosk to communicate with other devices of the parking locator system. The transceiver may be configured to transmit and receive data or information through wired or wireless communication links as well as various networks. The processors may be configured to execute instructions to allow the kiosk to perform its functions. These instructions may be hard wired into the processor, stored on a storage device, or both in one or more embodiments.

It is noted that the storage device may also store parking and other information. For example, a log or other record of payments, parking times, identifying information may be stored by the processor on the memory device. It is noted that the parking kiosk 904 may also store and access parking and other information on a remote device, such as a server, using its transceiver.

Figure 10:
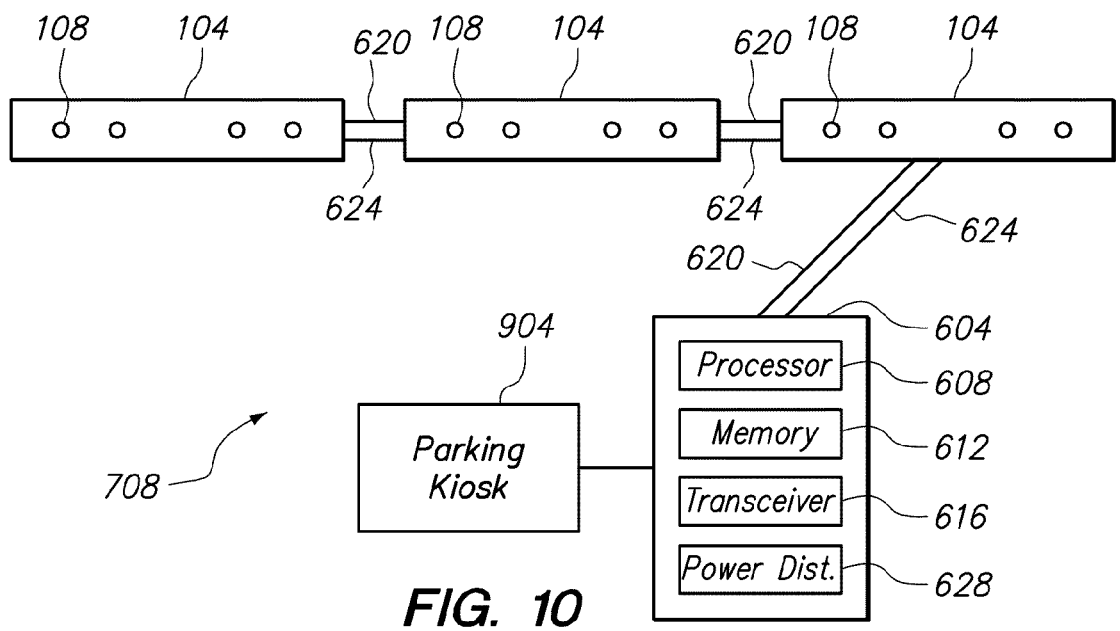
FIG. 10 is a block diagram of a parking locator cluster having a parking kiosk according to an embodiment of the invention.

As shown in FIG. 10, in one or more embodiments, the parking kiosk 904 may be used with a parking locator cluster 708. In FIG. 10, the parking kiosk 904 is in communication with a control box 604 and may send and receive parking information as well as other information to and from the control box. As stated above, this communication may be wired or wireless.

It is noted that the parking kiosk 904 may be configured as a control box in one or more embodiments. For instance, a parking kiosk 904 may comprise a power distributor and/or other components of a control box to perform the function of a control box. In these embodiments, parking information could be directly received from one or more parking locators by the parking kiosk 904 and a separate control box 604 would not be required.

The parking information allows the parking kiosk 904 to determine occupied and unoccupied parking spaces. Accordingly, the parking kiosk 904 may utilize the parking information to verify a driver's inputs when paying for parking. For instance, the parking information may be used to verify that the driver has correctly entered the space number or location of the parking space at which he or she is parked. This is beneficial because it helps ensure that the driver is paying for the right parking space and that parking tickets are not erroneously issued to the driver.

The parking locators may identify themselves through a code or other identifier sent with the parking information. The parking kiosk 904 may utilize this information to determine the location (e.g. street, address, latitude/longitude) where the driver is parked. For example, the parking kiosk 904 may query a database requesting the location of a particular parking locator. The location information may be used to provide targeted promotional materials, as will be discussed further below.

It is contemplated that the parking kiosk 904 may utilize the control box's transceiver 616 to communicate with other devices such as a location server of the parking locator system. In this manner, parking information may also or alternatively be communicated between the parking kiosk 904 and a location server through the control box 604. This is beneficial especially because the location server may store information, such a user information, which may not be available on the control box.

To illustrate, the parking kiosk 904 may access user accounts or user information on the location server to allow for automated payment of parking fees. For example, if an account holder's vehicle is identified by a parking locator, or if the account holder identifies him or herself at a parking kiosk 904, parking fees may be automatically charged to the user using previously saved payment information. In addition, it is contemplated that the user accounts may have one or more saved preferences that allow customization of the parking kiosk 904 interface or operation for particular users.

It is noted that a user's parking history may be stored or associated with the user account. For example, the locations or spaces a user has parked at, the times when a user parks, or both may be collected and recorded on a location or other server. As can be seen, the parking locator system may collect a volume of data regarding the parking habits or parking history of drivers. In one or more embodiments, this data may be provided to providers or other individuals or entities seeking such data. The data may be made anonymous such that information pertaining to particular drivers is not accessible. For instance, the data may be provided as statistical or demographic information in one or more embodiments. In addition, it is contemplated that drivers may be given the option to opt out so that their information remains private.

The data may be offered for a subscription fee or flat fee or other payment method. It is contemplated that periodic reports and information about drivers who have parked within a space of the parking locator system may be provided. In some embodiments, such reports and information may be provided as requested. Revenue from distributing this parking history data may be used to, at least partially, pay for the costs associated with the parking locator system.

The parking kiosk 904 need not be connected to parking locators 104 or a control box 604 in some embodiments. Stated another way, the parking kiosk 904 may be independent and need not be included in a parking locator cluster in some embodiments. For example, the parking kiosk 904 may communicate with location and other servers, parking locators, and other devices through one or more of its own transceivers or communication devices. It is contemplated that individual communication devices may be configured to communicate with particular external devices. For example, one communication device may be used to communicate with one or more parking locators 104 while another communication device may be configured to communicate with a server such as through a network.

In one or more embodiments, the parking locator system may include a promotion distribution system that may be provided to drivers through a parking kiosk 904. This promotion feature may include discounts, free offers, other promotional offers, marketing information, and the like from businesses, merchants, vendors, or other providers. In one embodiment, the driver may be provided discounts, promotions, and offers from businesses around the parking space in which the driver has parked. For example, in one embodiment, the driver may receive discounts, promotions, and free merchandise from businesses within an area surrounding the parking kiosk 904 or parking space in which the driver has parked.

It is contemplated that other users, such as pedestrians, may use the parking kiosk 904 to browse promotional materials offered by providers. In one embodiment, such users may not be provided the promotional materials without first paying for parking. In another embodiment, the promotional materials may be provided without condition.

Figure 11A:
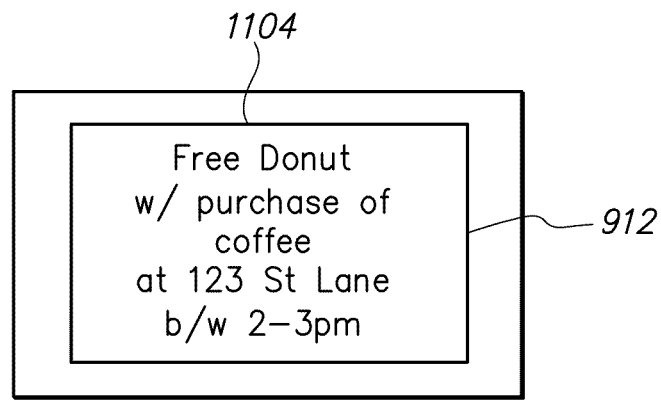
FIG. 11A illustrates exemplary promotional material according to an embodiment of the invention.

The promotional materials may be distributed or presented electronically or non-electronically in one or more embodiments. For example promotional materials may be printed on a physical medium, such as a paper medium, or may be presented on an electronic medium, such as on a display or screen. FIG. 11A illustrates exemplary promotional material 1104 comprising a coupon for a free donut at a nearby coffee shop presented on a display 912 of a parking kiosk 904. As can be seen, the provider or merchant's address/location may be distributed with the promotional material in one or more embodiments. Other information associated with the promotional material may also be presented. For example, contact information for the provider may be presented with the promotional material.

Figure 11B:
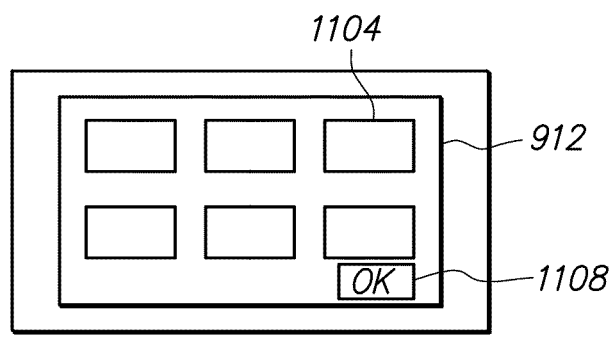
FIG. 11B illustrates an exemplary selection menu for promotional materials according to an embodiment of the invention.
Figure 11C:
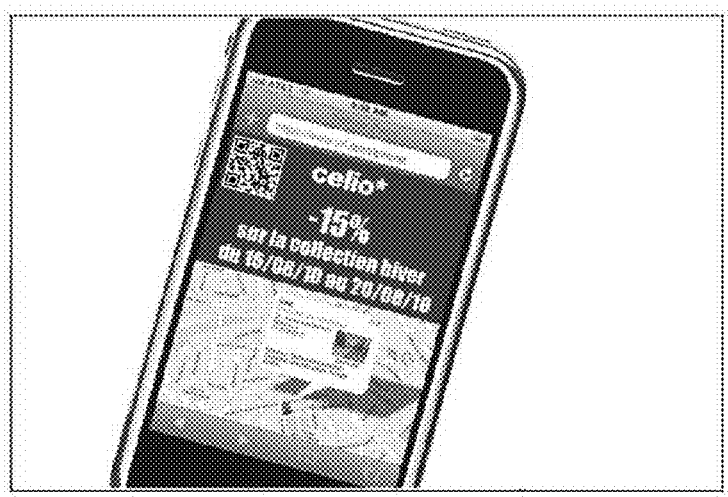
FIG. 11C illustrates exemplary promotional material according to an embodiment of the invention.

In one embodiment, promotional materials 1104 may comprise or be accompanied by a video and/or audio presentation to inform the driver of what is being offered to the driver. Such presentation may be provided via the display 912, one or more speakers, or both of the parking kiosk 904. It will be understood that such presentation may also be transferred to and presented via another electronic device having a screen and/or one or more speakers. For example, in FIG. 11C, the promotional material 1104 is shown on a hand held electronic device. As can be seen, the promotional material 1104 may share a screen with other information. The parking kiosk 904 may include one or more communication devices to communicate with such hand held or other electronic devices. For example, the parking kiosk 904 may comprise a Bluetooth or WiFi communication device for such purposes.

Of course, the same promotional material 1104 as that shown in FIG. 11A or other promotional material may be printed by the printer 920 to be provided to a driver, or issued as pre-printed materials via a media dispenser. It is contemplated that promotional materials 1104 may be mailed as well. This is beneficial in that it entices the user to return to the same area after receiving the mailed promotional materials. Also, the user may be enticed to input his or her address information in exchange for the benefits provided by the mailed promotional materials 1104. It is also contemplated that the driver may be given the option to choose electronic delivery, non-electronic delivery (e.g. printer or mail delivery), or both of the promotional materials 1104 in one or more embodiments. Such option may be presented on the display of the parking kiosk 904 and selected through one or more user inputs of the kiosk.

In some embodiments, the promotional materials 1104 may be delivered to one or more electronic devices through a wired or wireless connection. For example, promotional materials may be sent to a device, such as a cell phone, smart phone, portable media player, or portable game system, through a Bluetooth connection, USB connection, or as an email, SMS text message, or GPRS data. This electronic delivery is advantageous in that no paper is used or wasted.

Once delivered, the promotional materials 1104 may be viewed on the electronic device. In addition, a driver may present the promotional materials to a vendor with the electronic device to receive the discount or other benefit provided by the materials. For example, the promotional materials 1104 may include a barcode that may be scanned off the screen of the driver's cell phone or other device. It is contemplated that a code, one or more words, a phrase, or the like may be presented to the driver as part of the promotional materials 1104. In this manner, promotion offers may be redeemed by the driver repeating or otherwise presenting the code, phrase, or the like to a vendor.

In some embodiments, promotional materials 1104 may comprise both electronic and non-electronic elements. For instance, promotional materials 1104 may comprise a store credit, currency, rebate, or other value transferred to a stored value card, stored value device, smart card, gift card, or the like. After the value is transferred, a printed receipt indicating the value transferred may be provided to the driver via the printer 920. The receipt may also include the business name and location along with any qualifying or other terms of the promotional offer. It is contemplated that the receipt may be electronic as well in some embodiments.

In some embodiments, the driver may be provided multiple promotions or categories of promotions and may be allowed to choose one or more of them. For instance, in FIG. 11B, the display 912 shows a selection of promotional materials 1104 from which the driver may pick one or more. This cuts down on costs and waste from printing unwanted promotional materials 1104 and prevents unwanted (electronic and non-electronic) promotional materials from inconveniencing the driver.

It is contemplated that promotional materials 1104 may be delivered by other kiosk-type devices, various stand alone media dispensers, or other delivery devices rather than parking kiosks 904. For example, promotional materials 1104 may be displayed, dispensed, or printed by a delivery device near one or more parking spaces. By virtue of its location, the delivery device provides promotional materials 1104 to drivers in a manner similar to that described with regard to the parking kiosk 904. Like a parking kiosk 904, a delivery device may be provided on a roll or other medium of previously printed or made promotional materials or may receive promotional materials through a distribution system, as will be described further below.

In one or more embodiments, the promotional materials 1104 may assist in traffic control. For example, higher discounts or other benefits may be increased if the driver parks during certain times of the day. In this manner, drivers may be incentivized to park in an area during off-peak or less traffic congested times of the day. To illustrate, the exemplary promotional material 1104 of FIG. 11A provides a time between 2-3 PM when the offer is valid.

In addition, promotional materials 1104 may be used to re-energize economic and other activity in certain areas. For example, enticing promotions for an area targeted for redevelopment may be provided. This encourages drivers to visit the redevelopment area which may increase economic activity in the area along with visitor traffic. As a further benefit, traffic in congested areas may be redirected to a redevelopment area. In this manner, traffic is reduced in congested areas while re-energizing other areas.

In one or more embodiments, the promotion feature may include a distribution system to receive and distribute promotional materials so that the materials can be provided to drivers. In general, the distribution system collects promotional materials from one or more businesses, vendors, merchants, or other providers. The distribution system may include one or more servers or devices from which parking kiosks may access the promotional materials for delivery to one or more drivers.

Figure 12:
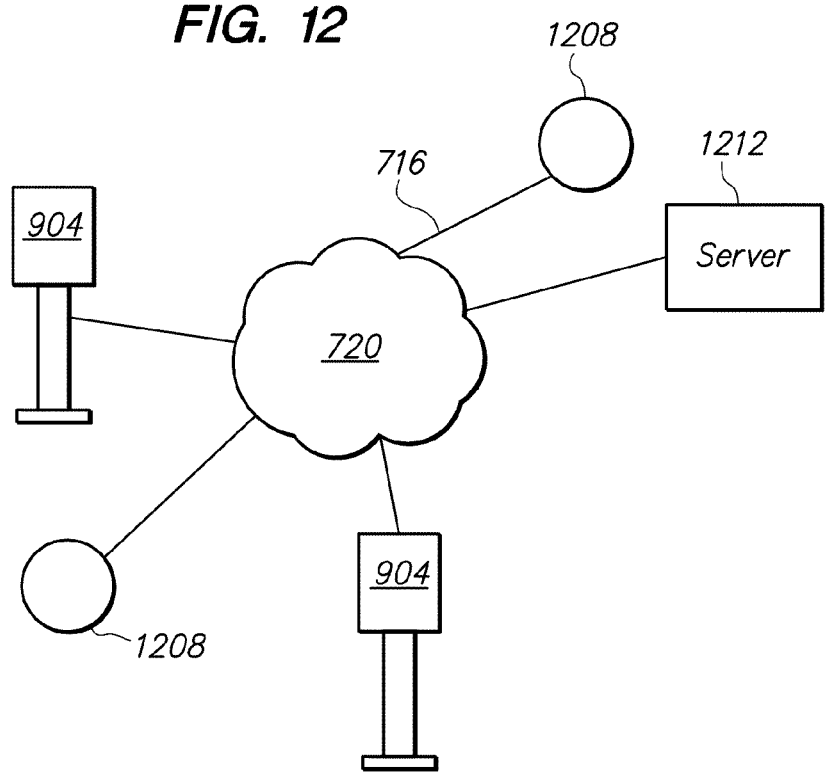
FIG. 12 is a block diagram of a promotion distribution system according to an embodiment of the invention.

FIG. 12 illustrates an exemplary distribution system. As shown, the distribution system comprises one or more repository servers 1212 connected to one or more parking kiosks 904 via a network 720 and one or more communication links 716. Providers may utilize one or more provider clients 1208, such as personal computers or other devices, to interact with repository servers 1212 through the network 720. To illustrate, a provider may utilize his or her computer to create, send, and update promotional materials to the repository server 1212. A parking kiosk 904 may then retrieve one or more of the promotional materials from the repository server 1212 based on the location of the kiosk relative to the provider's location.

The repository server 1212 may comprise one or more processors, storage devices, and transceivers (e.g. network interfaces). The processors may execute instructions, such as machine readable code, stored on the storage devices which cause the repository server 1212 to perform its functions as described herein. In addition, data such as the text, images, sound, audio, video, and the like which make up the promotional materials may be stored on the storage devices. As will be discussed below, other data, such a provider locations, may also be associated with the promotional materials and stored on the memory devices. It will be understood that the repository server 1212 may communicate with other devices, such as storage or web servers, to receive, update, and distribute the promotional materials.

In one embodiment, the repository server 1212 may comprise a web server or be connected to a web server to allow provider clients 1208 to create, store, update, and/or delete promotional materials on the server via a web interface. Of course, other interfaces other than a web interface may be used. For example, the provider clients 1208 may run a database application configured to interact with the repository server 1212.

As stated, the repository server 1212 may store text as well as multimedia files such as animations, video, pictures, and audio for each promotional material. This data may be stored in a database in one or more embodiments. The promotional materials may include other data as well. For example, expiration dates, start and/or end times for offers/promotions, and terms and conditions may be include with the promotional materials. In this manner, a provider may control when and how a promotional material is presented to drivers. If desired, a parking authority such as a city or municipality may require or request providers that use the distribution system to make better offers available at certain times to incentivize drivers to park at certain times of the day. As stated above, this may be used to reduce traffic congestion or to re-energize certain areas.

The provider's location may also be included or associated with the providers' promotional material in one or more embodiments. This allows promotional materials only for nearby providers to be delivered to a driver by the parking kiosk 904. In one embodiment, the repository server 1212 provides promotional materials for providers within a target area. Typically, but not always, the target area may be an area extending a particular distance surrounding the parking kiosk 904. For example, in some situations only promotional materials for businesses on the same street, block, or section of a block as the parking kiosk 904 may be provided. In other situations, promotional materials for providers on adjacent streets or blocks may be provided as well. Typically, but not always, the promotional materials presented to a driver will have provider locations within walking distance so that the driver does not have to leave his or her parking space to use the promotional materials. However, it will be understood that various distances may be used.

The provider may be permitted to define one or more target areas surrounding the provider's location or remote from the provider's location in which to offer promotional materials. In addition to the above, a target area may be measured as various distances from the parking kiosk or other point, in fractions of a block, full blocks, multiple blocks, and the like. For example, a target area may be a distance surrounding the parking locator or parking space at which the driver has parked. Specifically defined city areas, or districts such as for example, the city center, commerce district, downtown, Saint-Germain district, or the like may also be used as target areas as well.

Target areas may be stored in the distribution system, such as on a repository server 1212 or other server. Target areas may be associated with the promotional materials so that a target area or areas for particular materials can be retrieved by a parking kiosk 904. In this manner, a vendor or business can control at which locations or parking kiosks 904 promotional materials for their business are provided. For example, a bait and tackle store may wish to target areas near fishing spots regardless of where these spots are located relative to the store's location. To accomplish this, the store may setup one or more target areas near or at the fishing spots.

In one or more embodiments, a provider may utilize a provider client 1208 to setup target areas for the provider's promotional materials. It is contemplated that the provider may be allowed to define target areas or that the provider may be allowed to select from a list of predefined target areas. Predefined target areas may be for example, the street or block where the parking kiosk is located, adjacent streets or blocks, one or more defined city areas, and the like. The provider's target area selections or definitions may be communicated to a repository server 1212 through the provider client 1208.

The distribution system may be integrated with the parking locator system in a variety of ways. In general, placing one or more parking kiosks 904, repository servers 1212, or both in communication with elements of a parking locator system, such as a control box, parking locator, or location server of a parking locator system, integrates the distribution system into the parking locator system.

A parking kiosk 904 may be configured to request promotional materials based on the location in which a vehicle is parked. This location information may be received from one or more parking locators. Alternatively the request may be based on the location of the driver or user. For example, the request may be based on the location of the parking kiosk 904 which the driver or user is currently using.

A request for promotional materials may then include the location or vicinity in which the vehicle is parked. The vicinity may be a defined area around or near the parking space where the user has parked. A system administrator or other personnel may define the vicinities for particular parking spaces or areas in one or more embodiments, and such definition(s) may be stored by a server, such as the repository server 1212.

Typically, a request for promotional materials will be sent to a repository server 1212. The repository server 1212 may then retrieve appropriate promotion materials from one or more storage devices. For example, promotional materials having an associated target area that is within, nearby, or that overlaps the vicinity in which the user has parked or is located may be retrieved. The repository server 1212 may then transmit the retrieved promotional materials to the parking kiosk 904. The parking kiosk 904 may then present one or more of the promotional materials to the user, such as in the manners described above.

It is contemplated that the parking kiosk 904 may be configured to organize the received promotional materials, such as by placing them in a particular order. For example, the promotional materials may be categorized by the types of goods or services offered. Where a user is identified by the parking kiosk 904, the parking kiosk may utilize personal characteristics or information associated with the user to prioritize or order the received promotional materials.

It is noted that a distribution system administrator or other personnel may configure the parking kiosk 904 (or repository server 1212 or both) to retrieve particular subsets of promotional materials. For example, to drive traffic to other areas of a city or other area, the parking kiosk 904 may be configured to retrieve promotional materials having a target area near or overlapping a vicinity, and also having a provider location/address that is remote from the vicinity. In this manner, if a user desires to take advantage of a promotion he or she must travel to the provider's location which is remote from his or her current vicinity (thus increasing visitation to the area where the provider is located). The distribution system may be configured to "favor" particular areas such that those areas may be more directly re-energized.

Figure 13:
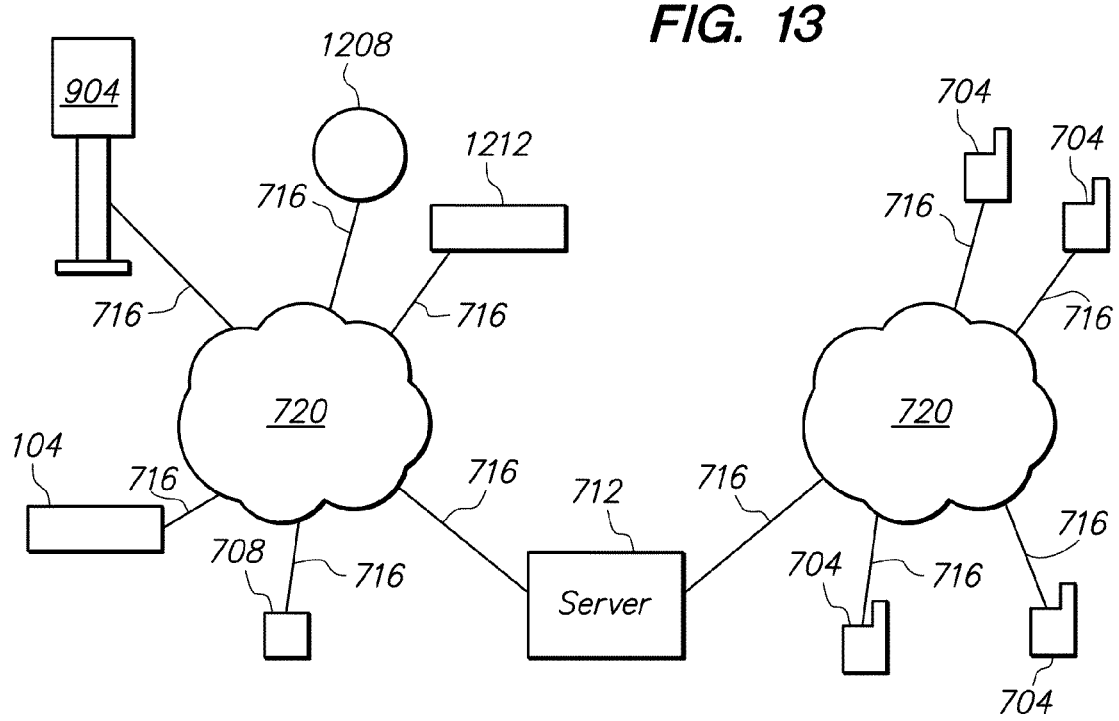
FIG. 13 is a block diagram of a parking locator system having a promotion distribution system according to an embodiment of the invention.

FIG. 13 illustrates an exemplary parking locator system having a distribution system for promotional materials. As shown, elements of the distribution system can communicate with a location server 712, parking locator cluster 708, an individual parking locator 104, as well as user devices 704 via one or more networks 720, communication links 716 (which may be wired or wireless), or both. Through the network 720 it is possible for each device to communicate with any other device if desired.

In operation, a parking kiosk 904 may attempt to identify the user paying for parking. As described above, this may be accomplished by querying identifying information stored in the location server 712. For example, a user may be identified by the vehicle he or she has parked (e.g. vehicle identifying information), by his or her payment information, or by the user identifying him or herself to the parking kiosk, such as through a username and password. It is contemplated that the parking kiosk 904 may include one or more biometric readers to identify users in some embodiments. Identification of a user allows the user's account information, parking history, and other information regarding the user to be retrieved, such as from a location server 712 or other server.

To illustrate, if a user can be identified, then specific promotions may be presented to the user. For example, promotional materials relating to specific goods or services near locations where the user has parked in the past may be delivered. In addition, promotional materials targeted to the user's demographic group or other characteristic may be presented.

It will be understood that the user need not be identified in all circumstances or embodiments in order to be presented promotional materials. For instance, promotional materials may be provided based only on the user's vicinity, as discussed above. In such embodiments, the parking kiosk 904 may utilize the location at which the user has parked or the location at which the user is using the parking kiosk to generated a request particular promotional materials.

For the purposes of targeting promotional materials to identified users, a log or record of the user's parking history may be kept. For example, when a user parks at a space within the parking locator system a record may be made and associated with the user's information or account in a server, such as a repository server 1212 or location server 712. Over time, a list of the user's visited locations may be compiled. Then, when the user next interacts with a parking kiosk 904, specific promotional materials for providers near or at the user's visited locations may be provided.

The user's parking history may also be used in a variety of other ways to provide specific promotional materials. For instance, a provider, when creating promotional materials, may be provided the option to present particular promotional materials to users who frequently park at certain locations. These locations may be that of competitors, businesses offering complementary servers (e.g. pet groomers and veterinary offices), or any other location the provider chooses. Of course, the parking history data may be used for other purposes, such as but not limited to marketing or other research, as well.

It is noted that use of the parking kiosk 904 may also be simplified for users that can be identified. For example, the user may not have to input address information for mailing of promotional materials. In addition, the user may save preferences or settings regarding the locations, types, categories, or providers from which the user will receive promotional materials.

Rather than being identified as a particular person, a user may be loosely identified in some situations for the purposes of providing targeted promotional materials. For example, a driver may be categorized as a commuter, tourist, casual visitor, business visitor, etc. . . . and provided particular promotional materials as a result. For instance, if the user is a tourist, he or she may receive promotional materials from the city government on specific sites to see, recommended businesses to visit, or other city government information that may be of interest to the user. If the user is a business visitor, he or she may be provided promotional materials from hotels, taxi services, and the like.

A loose identification or categorization of a user may occur in various ways. In one embodiment, the user's payment information or identifying information may be used to categorize the user. For example, if a credit card number, account number, zip code, or telephone number indicates the user is from another state or country, the user may be categorized as a tourist. In another example, a user may be categorized as a business visitor if his or her payment information indicates use of a business or corporate credit card or account for parking fee payment.

In some embodiments, the user may be queried by the parking kiosk 904 for information that may be used to categorize the user. For example, the user may be required or requested to enter the license plate number of his or her vehicle. If the license plate number indicates a rental car, the user may be categorized as a tourist or casual visitor. Of course, the user may be asked to categorize him or herself as well. For example, a menu of categories may be presented and the user allowed to choose one or more of the categories. To illustrate, the parking kiosk 904 may present a menu of buttons labeled "Tourist", "Business Visitor", and "Local". Once a category is chose, the promotional materials for the chosen category may be delivered to the user.

It is noted that, in some cases, it may be difficult to determine a category for a user. In these cases, a default category may be used. For instance, users that cannot be categorized may be automatically categorized as locals or another category. Of course, there may be a particular category for such users that cannot be categorized, and such category may include its own particular promotional materials. For example, the user may be categorized as an anonymous user and be presented promotional materials from a generic set of promotional materials. It is contemplated that, in one or more embodiments, both identified users and unidentified users may be categorized for the purposes of distributing particular promotional materials. In other embodiments, only unidentified users may be categorized.

Presentation (or delivery) of traffic information, parking information, promotional materials, and other information may be provided by the parking locator system in various ways. In one or more embodiments, such presentation may occur through a screen or display, or be on paper or a similar medium, such as already described above. FIGS. 14A-14E illustrate some exemplary presentations which may be provided by the parking locator system.

Figure 14A:
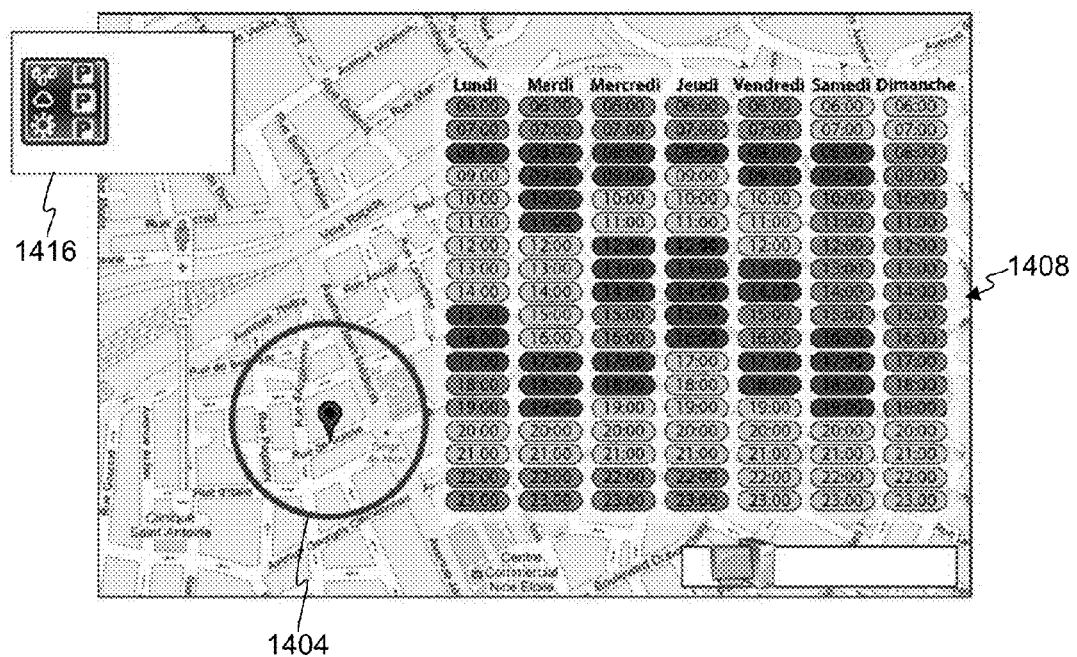
FIG. 14A illustrates an exemplary presentation of parking availability according to an embodiment of the invention.

FIG. 14A illustrates a parking availability chart 1408 for a search area 1404 indicated by the circle in the figure. As can be seen, each day of the week may be shown in the chart with one or more color coded, shaded, or otherwise differentiated parking times. A driver may use the chart 1408 to determine parking availability based on the color or other characteristic of the times in the chart. In the example of FIG. 14A, medium shading means parking is definitely available, light shading means available parking is questionable (e.g., there are some parking spaces open at some times, or parking space are only open for short periods of time before they are reoccupied), and dark shading means no parking is available. It is contemplated that the driver may be provided a legend 1416, such as in the upper left corner of FIG. 14A, to discern the meaning of the color or other characteristic of the parking times. Of course, color, shading, or other characteristics may refer to various measures of parking availability in one or more embodiments.

Figure 14B:
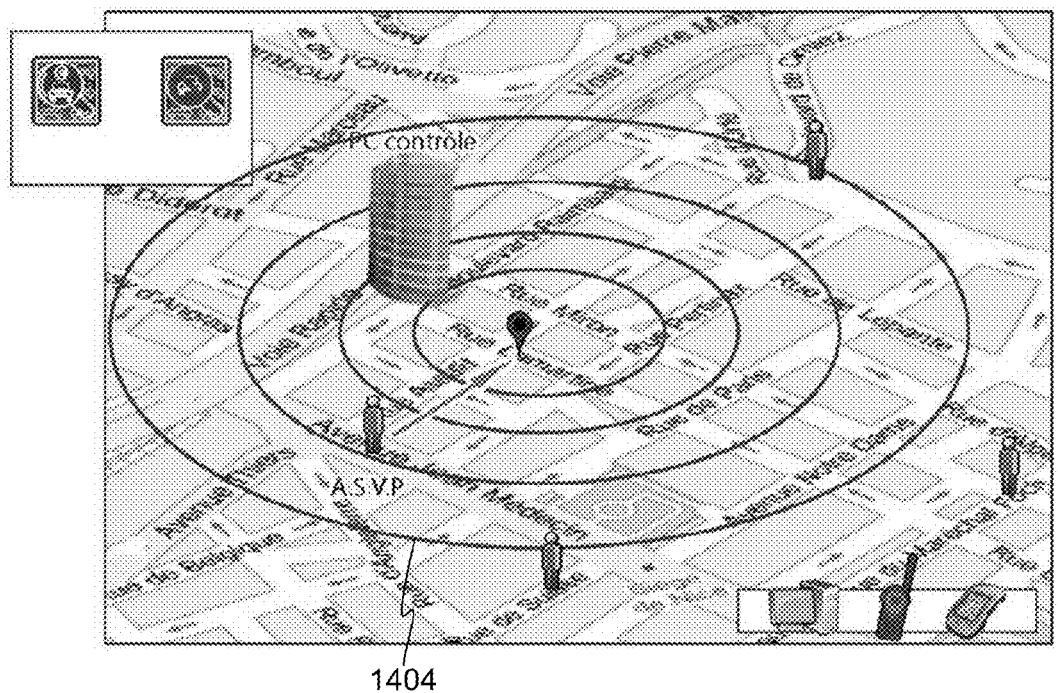
FIG. 14B illustrates an exemplary presentation of parking search areas according to an embodiment of the invention.

In FIG. 14A, a particular search area has been defined. It will be understood that a driver may define other search areas 1404, and that the parking availability chart 1408 may be accordingly updated. For instance, FIG. 14B illustrates how a search area 1404 may be increased or decreased. This allows a driver both to focus a search on an area 1404, and to expand the search to find other available spaces. For example, if no spaces are within the driver's first search area 1404, he or she may expand the search area. In FIG. 14B, this is shown by circle(s) of increasing size. It is contemplated that the driver may expand the search area 1404 as desired or that the driver may be given a selection of differently sized search areas and be permitted to choose from the selection. The driver may also start with a large search area 1404 and reduce the search area to find a parking space, if he or she desires.

Of course, search areas 1404 may be defined in a variety of ways other than by the area within a circle. For example, one or more streets, blocks, districts, or portions thereof may be used as a search area 1401. If a new search area 1401 is defined, it is contemplated that the parking availability chart or other presentation of parking availability may be accordingly updated in one or more embodiments.

Figure 14C:
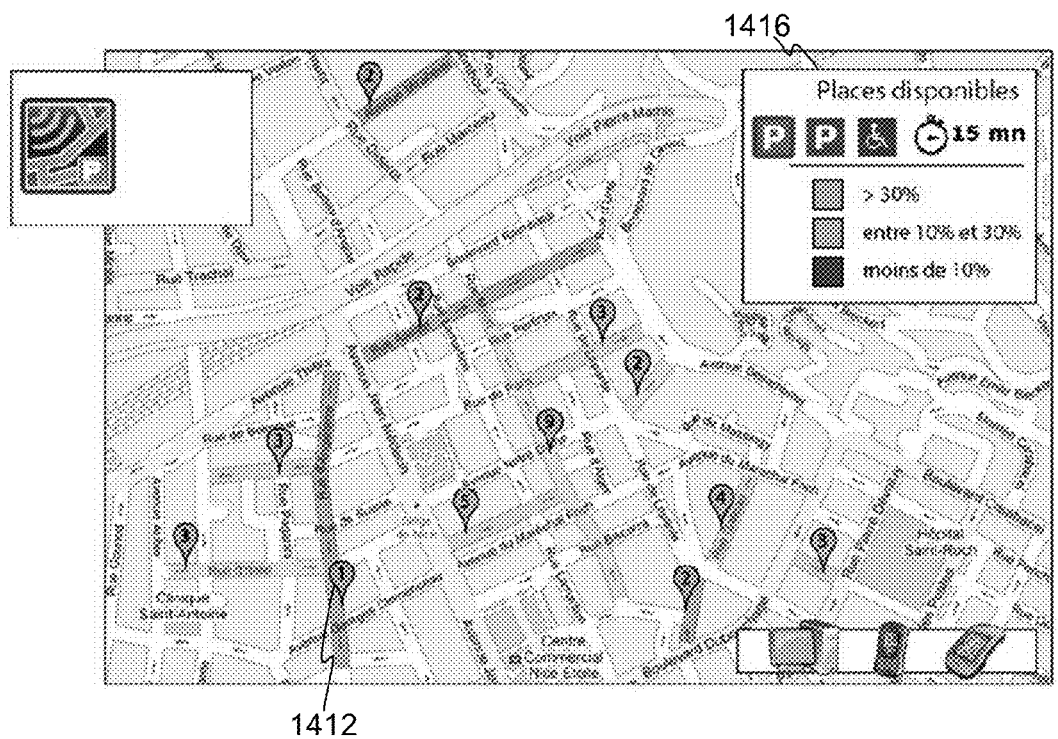
FIG. 14C illustrates an exemplary presentation of parking availability according to an embodiment of the invention.

FIG. 14C illustrates another exemplary display for parking availability. As shown here, streets or portions thereof have been shaded to represent their available parking spaces. Of course, color or other characteristics in addition or instead of shading could be used to represent the same. As can be seen by the legend 1416 of FIG. 14C, the available parking may be presented as a percentage of the parking spaces for a street or portion thereof. In the figure, a first shading or characteristic indicates greater than 30% of the spaces are available, a second shading or characteristic indicates between 10% and 30% of the spaces are available, and a third shading or characteristic indicates less than 10% of the spaces are available. It is note that, in addition or alternatively, the actual number of available spaces may be provided, as can be seen by the numbered tags 1412 of FIG. 14C.

Figure 14D:
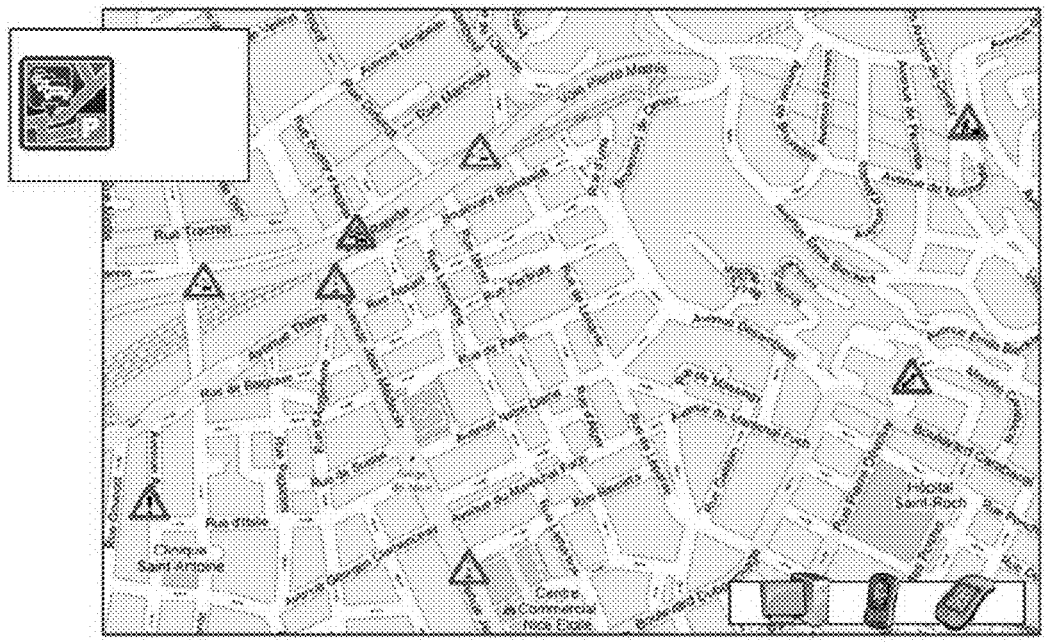
FIG. 14D illustrates an exemplary road status presentation according to an embodiment of the invention.

As stated, traffic information may also be provided in some embodiments. FIG. 14D provides an exemplary display of parking information that may be provided by the parking locator system. As can be seen, the parking locator system is capable of providing detailed traffic information. For example, in addition to notifying drivers of traffic issues, the parking locator system may identify road hazards, construction, undesirable roads/routes (e.g. roads that are narrow, steep, in bad neighborhoods, etc. . . . ), and emergencies, among other things. In FIG. 14D, the parking locator system utilizes graphics or icons, however, it will be understood that other indicators, such as one or more colors, shading, or the like may be used.

Figure 14E:
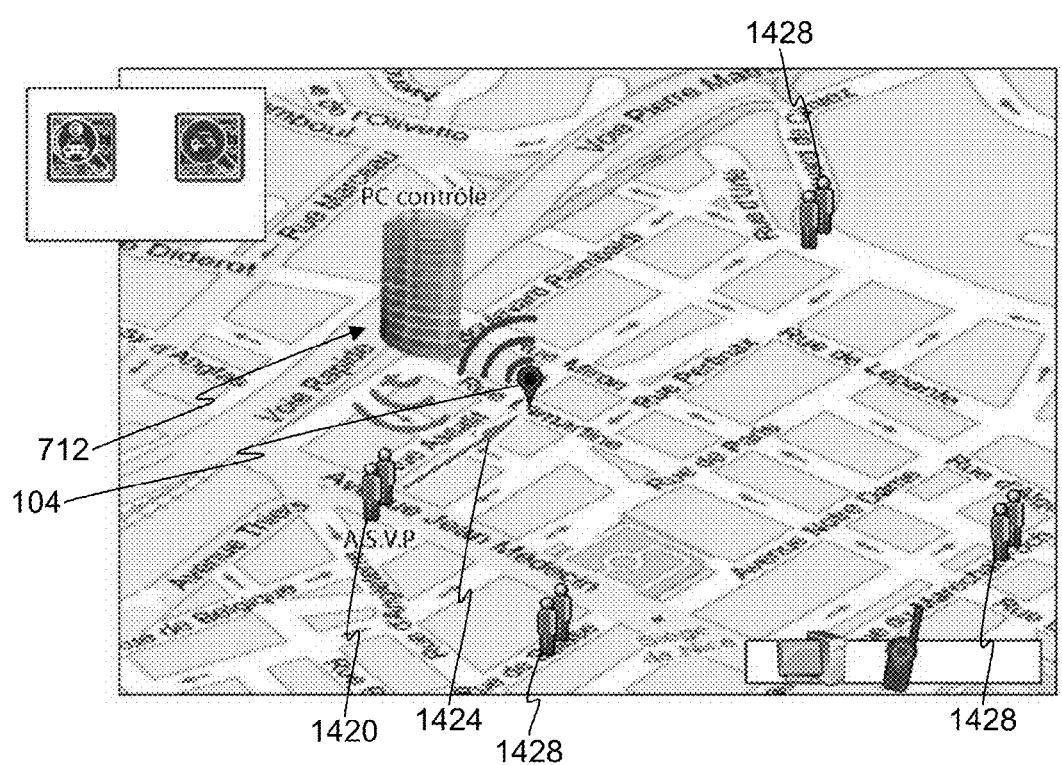
FIG. 14E illustrates an exemplary instructional presentation according to an embodiment of the invention.

FIG. 14E illustrates an exemplary presentation showing a driver how the parking locator system may operate in one embodiment. This is beneficial in that it informs drivers how to use the system and how the system works. In addition, this is beneficial in that, after or during viewing of the presentation, drivers may be enticed or encouraged to sign up or subscribe to the parking locator system's revenue generating services, such as those described herein. For example, in one embodiment, the driver may be shown this presentation at a parking kiosk or on a user device when first encountering the parking locator system. Realizing the benefits, the driver may then sign up or subscribe to one or more services provided by the parking locator system.

In the example of FIG. 14E, the driver is being shown a parking locator 104 or parking locator cluster which is sending parking information indicating parking space availability to a location server 712 within a building. The user 1420 may query and/or receive the parking information from the location server 712 such as through a user device. As shown by the arrow 1424, the user may be provided directions to any unoccupied parking spaces that are available. Also illustrated is a social networking aspect of the parking locator system as has been described above. As can be seen, the location of other users 1428 may be provided to the user 1420 by the parking locator system, such as through the location server 712. In this manner, as described above, the user 1420 may locate or meet other users 1428 of the parking locator system.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A promotion distribution system that distributes promotional materials based on a location of a parking space at which a user has parked a vehicle comprising:
    one or more parking locators associated with one or more parking spaces in a vicinity, the one or more parking locators configured to generate parking information comprising information indicating the presence or absence of a vehicle within at least one of the one or more parking spaces in the vicinity;
    a repository server configured to
        receive location information which identifies the vicinity;
        receive first promotional material from a first merchant wherein the first promotional material includes a first merchant location and one or more target areas wherein the one or more target areas define areas in which the first merchant wants the first promotional material to be distributed, and wherein said first promotional material is configured to be retrieved based upon a first selection criteria specified by the first merchant, the first selection criteria including the one or more target areas overlapping with the location information which identifies the vicinity;
        receive second promotional material associated with a second merchant, wherein the second promotional material is distributed to drive vehicle traffic outside of the vicinity to where the second merchant is located, and wherein said second promotional material is configured to be retrieved based upon second selection criteria specified by an entity separate from the second merchant, the second selection criteria including vehicle traffic conditions in the vicinity; and
    a parking kiosk configured to:
        receive the parking information generated by the one or more parking locators in the vicinity;
        retrieve from the repository server at least one promotional material selected from among the first promotional material and the second promotional material based upon the location information which identifies the vicinity, the first selection criteria specified by the first merchant and the second selection criteria specified by the entity; and
        distribute the at least one retrieved promotional material to a user parked at the one or more parking spaces.

2. The promotion distribution system of claim 1, wherein the first promotional material includes a first target area and a second target area, separate from the first target area, and wherein the first merchant location is in one of the first target area or the second target area.

3. The promotion distribution system of claim 1, wherein the at least one promotional material is valid during a particular time period to encourage one or more drivers to visit the one or more areas outside of the vicinity at the particular time period.

4. The promotion distribution system of claim 1, wherein the parking kiosk is configured to retrieve the at least one promotional material from the repository server in response to input from a pedestrian requesting one or more of the one or more promotional materials.

5. The promotion distribution system of claim 1 further comprising one or more additional parking locators configured to generate parking information for one or more parking spaces in a second vicinity, wherein the parking kiosk is configured to receive the parking information generated by the one or more parking locators at the second vicinity, receive second location information identifying the second vicinity and retrieve the at least one promotional material selected from among the first promotional material and the second promotional material based upon the second location information, the first selection criteria and the second selection criteria.

6. The promotion distribution system of claim 1, wherein the parking kiosk comprises a display configured to distribute the retrieved promotional material by electronically displaying the retrieved promotional material.

7. A parking kiosk configured to distribute promotional materials adjacent one or more parking spaces comprising:
   one or more communication devices configured to:
      receive parking information indicating the presence of a parked vehicle within one of a plurality of vicinities, each of the plurality of vicinities having a defined area;
      retrieve from a repository server first promotional material having a target area, selected by a first merchant associated with the first promotional material, that overlaps a vicinity where the parked vehicle is present wherein the target area defines an area in which the first merchant wants the promotional material to be distributed and wherein said first promotional material is configured to be retrieved based upon a first selection criteria specified by the first merchant, the first selection criteria including the target area overlapping with the vicinity; and second promotional material associated with a second merchant wherein the second promotional material is distributed to drive vehicle traffic outside of the vicinity to where the second merchant is located and wherein said second promotional material is configured to be retrieved based upon second selection criteria specified by an entity separate from the second merchant, the second selection criteria including vehicle traffic conditions in the vicinity;
      and
      receive from the repository server one or more promotional materials, selected from among the first promotional material and second promotional material based upon location information associated with the vicinity, first selection criteria specified by the first merchant and the second selection criteria specified by the entity;
   a presentation device configured to present to a user the one or more received promotional materials including one or more merchant locations associated thereto, the presentation device selected from the group consisting of a screen, electronic display, printer, and media dispenser;
   a payment acceptor configured to receive payment for parking within the vicinity from the user;
   one or more transceivers and
   an enclosure configured to secure the one or more transceivers, the presentation device, and the payment acceptor.

8. The parking kiosk of claim 7, wherein the presentation device is configured to present the one or more promotional materials after payment has been received by the payment acceptor.

9. The parking kiosk of claim 7, wherein at least one of the one or more communication devices is in communication with one or more parking locators to receive the parking information indicating the presence of the parked vehicle within the vicinity.

10. The parking kiosk of claim 7, wherein the one or more communication devices are further configured to transmit the one or more received promotional materials to a portable electronic device belonging to the user.

11. The parking kiosk of claim 7, wherein the one or more communication devices are configured to request from the repository server one or more promotional materials having a target area that overlaps the vicinity where the parked vehicle is present and having a merchant location outside the target area where the parked vehicle is present.

12. The parking kiosk of claim 7, wherein the enclosure is configured to secure the one or more transceivers, the presentation device, and the payment acceptor at a location adjacent one or more parking spaces.

13. A method in a system providing promotional materials based on a vicinity in which a user parks a vehicle comprising:
   receiving, by a processor, first promotional material from a first merchant the first promotional material including a first merchant location and a first target area wherein the first target area identifies an area in which the first merchant wants the first promotional material to be distributed and wherein said first promotional material is configured to be retrieved based upon a first selection criteria specified by the first merchant, the first selection criteria including the first target area overlapping with the location information which identifies the vicinity;
   receiving, by a processor, second promotional material from a second merchant including a second merchant location wherein the second promotional material is distributed to drive vehicle traffic outside of the vicinity to where the second merchant is located and wherein said second promotional material is configured to be retrieved based upon second selection criteria specified by an entity separate from the second merchant, the second selection criteria including vehicle traffic conditions in the vicinity;
   storing, by the processor, the first promotional material and the second promotional material on one or more memory storage devices accessible via a repository server;
   detecting, by the processor, the presence of a parked vehicle in one of a plurality of vicinities;
   receiving location information which identifies the vicinity; and
   retrieving, by the processor, a promotional material from the one or more storage devices selected from among the first promotional material and the second promotional material based upon the location information which identifies the vicinity, the first criteria specified by the first merchant and the second selection criteria specified the entity;
   outputting, by a processor, the retrieved promotional material.

14. The method of claim 13 further comprising providing one or more parking locators at the plurality of vicinities, wherein the one or more parking locators are configured to detect the presence of the parked vehicle in their respective vicinities.

15. The method of claim 13 further comprising providing a parking kiosk configured to output the retrieved promotional material.

16. The method of claim 13, wherein retrieved the promotional material has a target area that overlaps the vicinity and a merchant location outside the target area.

\* \* \* \* \*